United States Patent
Gardner et al.

(10) Patent No.: US 7,918,374 B2
(45) Date of Patent: Apr. 5, 2011

(54) PORTABLE FASTENER DRIVING DEVICE

(75) Inventors: Michael Gardner, Hudson, OH (US); Glenn A. Baker, Cleveland, OH (US); Mirko Champa, North Olmsted, OH (US); Jim Bias, Cypress, TX (US); Jeff Sutherland, Mogadore, OH (US)

(73) Assignee: HALEX/Scott Fetzer Company, Bedford Heights, OH (US)

( * ) Notice: Subject to any disclaimer, the term of this patent is extended or adjusted under 35 U.S.C. 154(b) by 80 days.

(21) Appl. No.: 11/944,607

(22) Filed: Nov. 24, 2007

(65) Prior Publication Data

US 2008/0179371 A1     Jul. 31, 2008

Related U.S. Application Data

(60) Provisional application No. 60/887,091, filed on Jan. 29, 2007.

(51) Int. Cl.
*B25C 1/061* (2006.01)
(52) U.S. Cl. .................. 227/130; 227/2; 227/5
(58) Field of Classification Search .......... 227/131, 227/147, 1, 2, 5; 320/166; 411/469; 361/160
See application file for complete search history.

(56) References Cited

U.S. PATENT DOCUMENTS

| | | | |
|---|---|---|---|
| 2,003,062 A * | 5/1935 | Wickwire ............... 411/469 |
| 2,632,356 A | 3/1953 | Thiel | |
| 3,076,373 A | 2/1963 | Matthews | |
| 3,141,171 A * | 7/1964 | Doyle et al. ............ 227/2 |
| 3,345,546 A | 10/1967 | Beltramo | |
| 3,605,402 A | 9/1971 | Larson | |
| 3,757,629 A | 9/1973 | Schneider | |
| 3,894,174 A | 7/1975 | Cartun | |
| 3,940,844 A | 3/1976 | Colby et al. | |
| 4,005,812 A | 2/1977 | Doyle et al. | |
| 4,014,244 A | 3/1977 | Larson | |
| 4,087,035 A | 5/1978 | Harmon | |
| 4,129,240 A | 12/1978 | Geist | |

(Continued)

FOREIGN PATENT DOCUMENTS

DE     3426072 A1     7/1984

(Continued)

OTHER PUBLICATIONS

Linear Technology Corporation; LT3750-Capacitor Charger Controller Product Webpage; 3 pages.

(Continued)

*Primary Examiner* — Paul R. Durand
*Assistant Examiner* — Nathaniel Chukwurah
(74) *Attorney, Agent, or Firm* — Hahn Loeser + Parks LLP

(57) ABSTRACT

The present invention includes various embodiments directed to apparatus and methods surrounding a fastener device. In particular embodiments, the fastener device is a quick charging and discharging device that includes a solenoid, a fastener striker, a flash capacitor, and a control circuit. Other novel features of the fastener device exist. In particular embodiments, the present invention also includes apparatus and methods related to deforming staples for securing conduit and the like, and staple insulation and insulated staples that may be discharged by the fastener device. The insulation may be provided in an ordinary staple strip for use in the fastener device. Each insulation form may include deformation voids to assist the adaptation of the insulation about a target object that is being secured by the insulated staple.

23 Claims, 18 Drawing Sheets

U.S. PATENT DOCUMENTS

| | | | |
|---|---|---|---|
| 4,183,453 | A | 1/1980 | Barrett et al. |
| 4,230,249 | A | 10/1980 | Nasiatka et al. |
| 4,293,088 | A | 10/1981 | Barrett et al. |
| 4,323,127 | A | 4/1982 | Cunningham |
| 4,349,143 | A | 9/1982 | Ewig |
| 4,380,312 | A | 4/1983 | Landrus |
| 4,405,073 | A | 9/1983 | Salleras Escalante |
| 4,491,262 | A | 1/1985 | Ewig |
| 4,573,624 | A | 3/1986 | Muller et al. |
| 4,598,852 | A | 7/1986 | Olesen |
| 4,655,222 | A | 4/1987 | Florez et al. |
| 4,700,876 | A | 10/1987 | Wingert |
| 4,724,992 | A | 2/1988 | Ohmori |
| 4,770,335 | A | 9/1988 | Wingert |
| 4,858,813 | A | 8/1989 | Wingert |
| 4,940,177 | A | 7/1990 | Jimena |
| 4,946,087 | A | 8/1990 | Wingert |
| 5,009,356 | A | 4/1991 | Chang |
| 5,098,004 | A | 3/1992 | Kerrigan |
| 5,105,329 | A | 4/1992 | Goldner |
| D330,699 | S | 11/1992 | Gill |
| 5,320,270 | A | 6/1994 | Crutcher |
| 5,426,561 | A * | 6/1995 | Yen et al. ............. 361/502 |
| 5,443,196 | A | 8/1995 | Burlington |
| 5,620,289 | A | 4/1997 | Curry |
| 5,732,870 | A | 3/1998 | Moorman et al. |
| 5,735,444 | A | 4/1998 | Wingert |
| 5,931,364 | A | 8/1999 | Dennis |
| 5,940,264 | A * | 8/1999 | Stevens et al. ............. 361/514 |
| 6,082,604 | A | 7/2000 | Dennis |
| 6,142,355 | A | 11/2000 | Wu |
| 6,237,827 | B1 | 5/2001 | Reckelhoff |
| 6,318,615 | B1 | 11/2001 | Walter |
| 6,364,193 | B1 | 4/2002 | Tsai |
| 6,382,492 | B1 | 5/2002 | Moorman et al. |
| 6,431,425 | B1 | 8/2002 | Moorman et al. |
| 6,518,733 | B1 | 2/2003 | Schenkel et al. |
| 6,607,111 | B2 | 8/2003 | Garvis et al. |
| 6,708,861 | B2 | 3/2004 | Osuga et al. |
| 6,753,673 | B2 | 6/2004 | Shiue et al. |
| 6,766,935 | B2 | 7/2004 | Pedicini et al. |
| 6,777,917 | B2 * | 8/2004 | Desprez et al. ............. 320/167 |
| 6,830,173 | B2 | 12/2004 | Barber et al. |
| 6,891,457 | B2 | 5/2005 | Sako |
| 7,011,242 | B2 | 3/2006 | Barlow et al. |
| 7,044,351 | B2 | 5/2006 | Ronconi |
| 7,108,164 | B2 | 9/2006 | Shima et al. |
| 7,243,440 | B2 * | 7/2007 | DeKeyser ............. 33/626 |
| 7,248,019 | B2 * | 7/2007 | Ookubo et al. ............. 320/114 |
| 7,292,005 | B2 | 11/2007 | Pietkiewicz et al. |
| 7,314,155 | B2 | 1/2008 | Moeller et al. |
| 2001/0033952 | A1 * | 10/2001 | Jenson et al. ............. 429/7 |
| 2002/0108474 | A1 * | 8/2002 | Adams ............. 81/487 |
| 2002/0134811 | A1 | 9/2002 | Napier et al. |
| 2005/0168340 | A1 * | 8/2005 | Mosher et al. ............. 340/572.8 |
| 2006/0066453 | A1 * | 3/2006 | Homanfar et al. ............. 340/686.2 |

FOREIGN PATENT DOCUMENTS

| | | |
|---|---|---|
| GB | 2344553 A | 6/2000 |
| JP | 1979-136478 | 10/1974 |
| KR | 96-28462 | 9/1996 |
| KR | 1997-014942 | 4/1997 |
| KR | 2003-0081392 | 10/2003 |
| KR | 10-2005-005776 | 1/2005 |

OTHER PUBLICATIONS

Linear Technology Corporation; LT3750 Capacitor Charger Controller Datasheet; 16 pages.

W.W. Cross Industries, Inc.; Viking Brand Super Staples From W. W. Cross; webpage; 1 page.

W.W. Cross Industries, Inc.; W. W. Cross Insulated Staples; webpage; 1 page.

Halex; Plastic Insulating Staples Product Website; 1 page (date unknown).

Halex; Cable Staples Product Website; 1 page (date unknown).

Halex; Insulated Staples for NM2 Wire Product Website; 1 page (date unknown).

Amazon.com; Makita T220D Cordless Stapler Product Wabpage; 3 pages (date unknown).

Dewalt; XRP Cordless Finish Nailers Product Literature; 2 pages (date unknown).

Senco; Cordless Finish 25 18 ga. Brad Nailer Parts Reference Guide; 4 pages (2006).

Gardnerbender.com; Color Code Insulated Staples Product Webpage; 2 pages (date unknown).

Makita; Models T220D and T220DW Cordless Staples Instruction Manual; 16 pages (1994).

Makita; Models T110D and T220DWCordless Staples Wiring Diagram; 2 pages (1992).

Regitar; RT5420B and RT70149B Cordless Staplers Product Literature; 3 pages (date unknown).

International Search Report for International Application No. PCT/US2008/052369.

Written Opinion of the International Searching Authority for International Application No. PCT/US2008/052369.

* cited by examiner

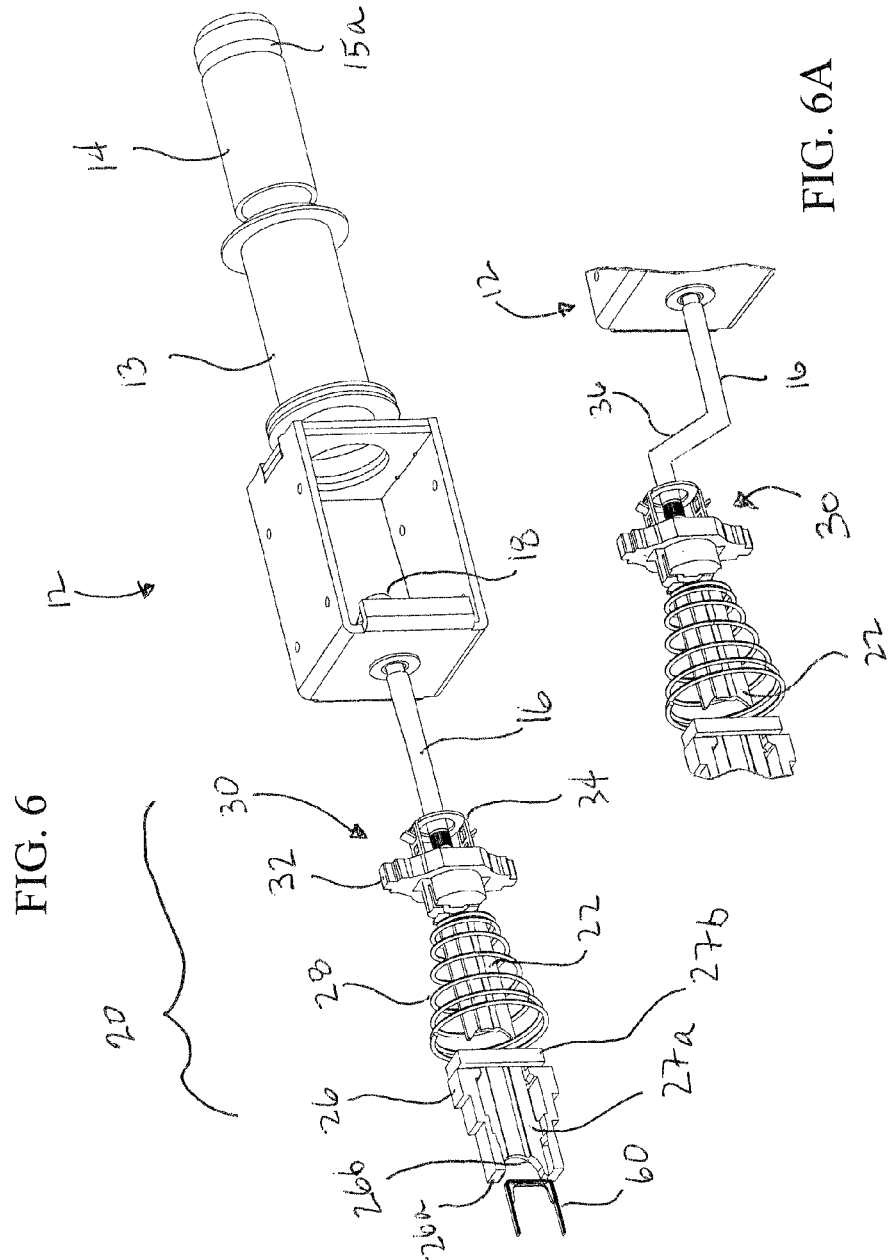

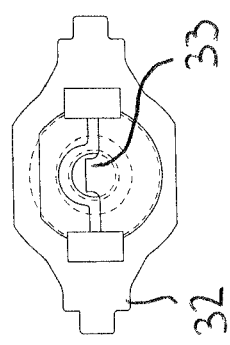
FIG. 10
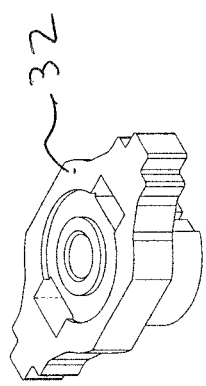
FIG. 9
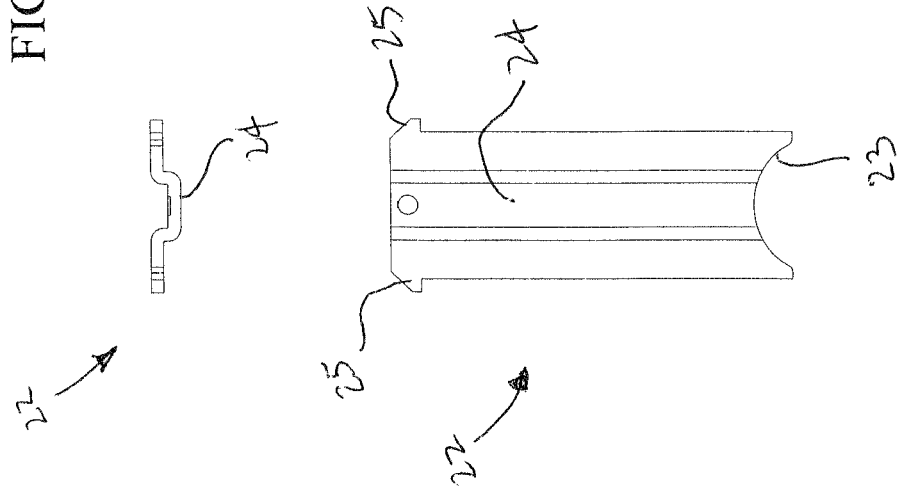
FIG. 8
FIG. 7

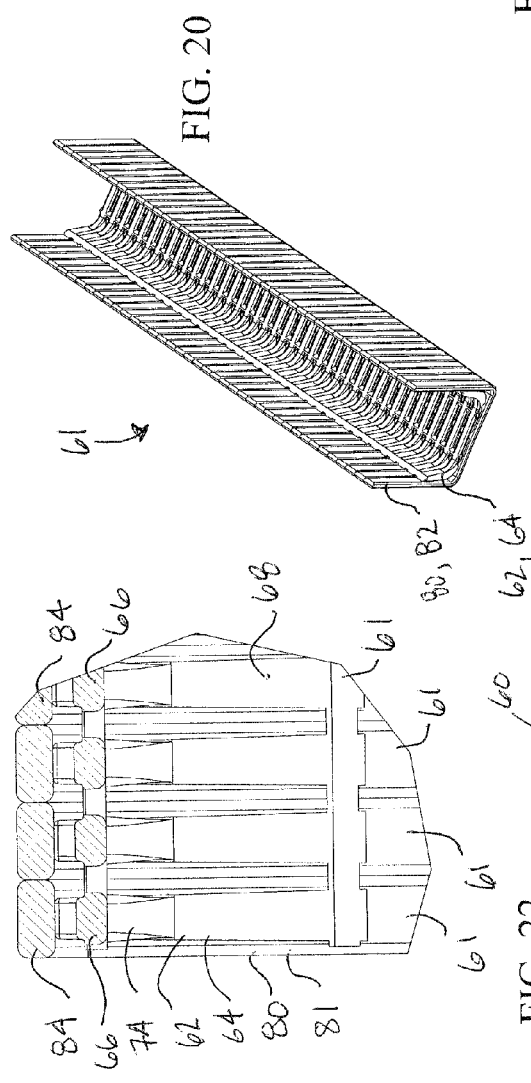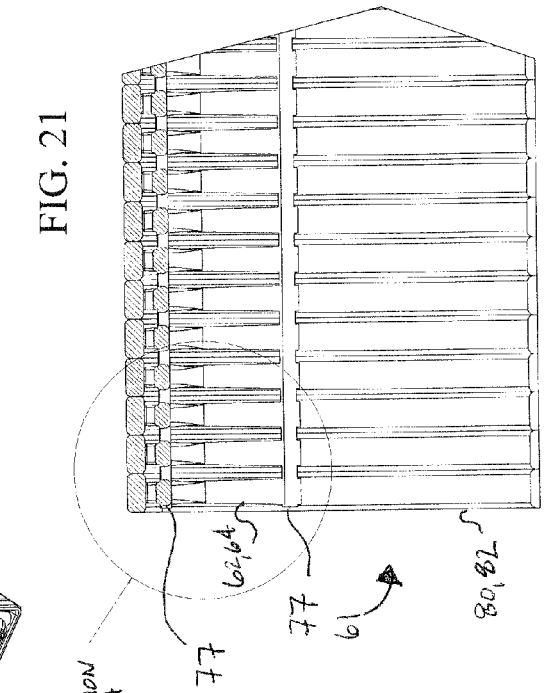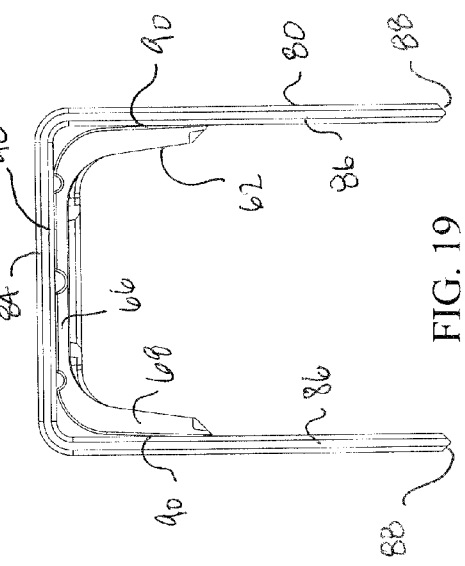

PORTABLE FASTENER DRIVING DEVICE

This application claims priority to U.S. provisional patent application Ser. No. 60/887,091, filed Jan. 29, 2007, the disclosure of which is hereby incorporated by reference.

DESCRIPTION OF THE RELATED ART

Embodiments of the present invention relate to a device for driving staples and other fasteners. More specifically, embodiments of the present invention relate to a portable, lightweight, hand-held device that utilizes a DC source to effectively drive staples or other fasteners under heavy duty applications at elevated drive forces and at short intervals of time while maintaining an extended battery life.

Prior art staplers and other fastener driving devices are well known. Many of these devices are manual (i.e., spring driven) or solely utilize an alternating current (AC) power source. Other fastener driving devices utilize direct current (DC) sources, such as batteries. DC driven devices are appealing for their portability; however, there are several draw-backs that significantly reduce their commercial appeal for heavy duty industrial or commercial uses.

Industrial or commercial fastener driving devices must be reliable, quickly refire, and drive the desired fasteners consistently and securely into more resistant (i.e., harder or denser) materials, such as, for example, wood, plastics, concrete, and composites thereof. Because batteries contain a limited amount of stored energy, it is difficult to provide high driving power while still providing quick refiring capabilities and an extended battery life. Consequently, prior art solenoid-driven fastener driving devices do not consistently provide elevated driving power with quick firing and recharging (i.e., refiring) capabilities. Further, DC operated devices may have severely limited battery life.

Staples are often used to secure cable and the like in homes and commercial buildings. To prevent cables and the like from moving, it may be desirous to deform a staple about the cable. Further, insulated staples are becoming more and more desired because they provide a flexible interface between the staple and the cable. This flexible interface is more forgiving and, therefore, safer since it is less apt to cut or abrade the cable, such as when the staple is over driven, when the cable moves due to ambient temperature fluctuations or cable expansion from electrical heat generation within the cable, or by relative movement between the cable and structure. Presently, there lacks an efficient means of manufacturing and providing an insulated staple, and providing insulation that is capable of properly shearing from a clip and adapting to a rounded cable or the like.

Accordingly, there remains a need to provide a fastener driving device and insulated staples that meet the inadequacies and deficiencies in the prior art, including those identified above. The fastener driving device and staples disclosed herein provide novel solutions to these and other problems.

SUMMARY OF THE INVENTION

Particular embodiments of the present invention include an apparatus for discharging and driving fasteners into work pieces. Particular embodiments of the present invention include a nailer or stapler device that includes a solenoid and a fastener striker in operational communication with the solenoid. The device also includes a flash capacitor in operational communication with the solenoid, the capacitor operating at 400 or more microfarads and having a charging capacity of at least 180 volts. The device further includes a control circuit in operational communication with the flash capacitor, the circuit configured to fully charge the flash capacitor from a direct current power source and fully discharge the capacitor within approximately 20 seconds or less, the power source having a charging capacity of at least approximately 12 volts.

Other particular embodiments of the present invention include a staple insulation form for use with a staple to provide an insulated staple, the staple having a width and a bight section extending between a pair of legs, the legs extending from an underside of the bight section, the insulation form comprising a crown section having a width and a top side, wherein the top side is configured for operable association with the underside of the staple bight section; and, wherein the crown width is less than or equal to a width of a staple.

Other particular embodiments of the present invention further include a method of discharging a fastener from a nailer or stapler device, the method may include the step of providing a fastener-discharging device having a solenoid, a flash capacitor, a direct current power source, and a control circuit, the flash capacitor operating at 400 or more microfarads and having a charging capacity of at least 180 volts, and the power source having a charging capacity of at least approximately 12 volts. Particular embodiment of the present invention may further include the steps of charging the capacitor within 20 seconds or less from the direct current power source from no charge to at least 180 volts, the charging occurring by way of a charging circuit of the control circuit, and discharging the capacitor in full to operate a solenoid, the solenoid thereby driving a striker to discharge a fastener, wherein the capacitor is charged and discharged within 20 seconds or less.

Particular embodiments of the present invention may further include methods for securing a target object to a work piece, the method may include a step of providing a stapler having a staple striker, the staple striker having a non-linear bottom edge. Other steps may include aligning the stapler over a target object, the target object being located on a work piece, and engaging a staple with the staple striker to discharge staple about the target object and into contact with the work piece. Another step may include deforming the staple with the striker bottom edge while the striker drives the staple into the work piece.

The foregoing and other objects, features and advantages of the invention will be apparent from the following more detailed descriptions of particular embodiments of the invention, as illustrated in the accompanying drawing wherein like reference numbers represent like parts of the invention.

BRIEF DESCRIPTION OF THE DRAWINGS

FIG. 6 is a side perspective view of the drive assembly, in accordance with an embodiment of the device shown in FIG. 1.

FIG. 6A is a partial side perspective view of the drive assembly shown in FIG. 6, showing an alternative embodiment of the drive assembly, in accordance with an embodiment of the device shown in FIG. 1.

FIG. 7 is a side view of the fastener striker, in accordance with an embodiment of device disclosed in FIG. 1.

FIG. 8 is a top view of the fastener striker shown in FIG. 7.

FIG. 9 is a perspective view of the coupler block, in accordance with an embodiment of device disclosed in FIG. 1.

FIG. 10 is a bottom view of the coupler block shown in FIG. 9;

FIG. 19 is a side view of an insulated staple, in accordance with an embodiment of present invention.

FIG. 20 is a perspective view of an insulated staple clip, in accordance with an embodiment of the present invention.

FIG. 21 is a cross-section view of the insulated staple clip shown in FIG. 20 where the cross-section is taken through a deformation void, in accordance with an embodiment of the present invention.

FIG. 22 is blown up view of Section A shown in FIG. 21.

DETAILED DESCRIPTION OF PARTICULAR EMBODIMENTS

Figure 1:
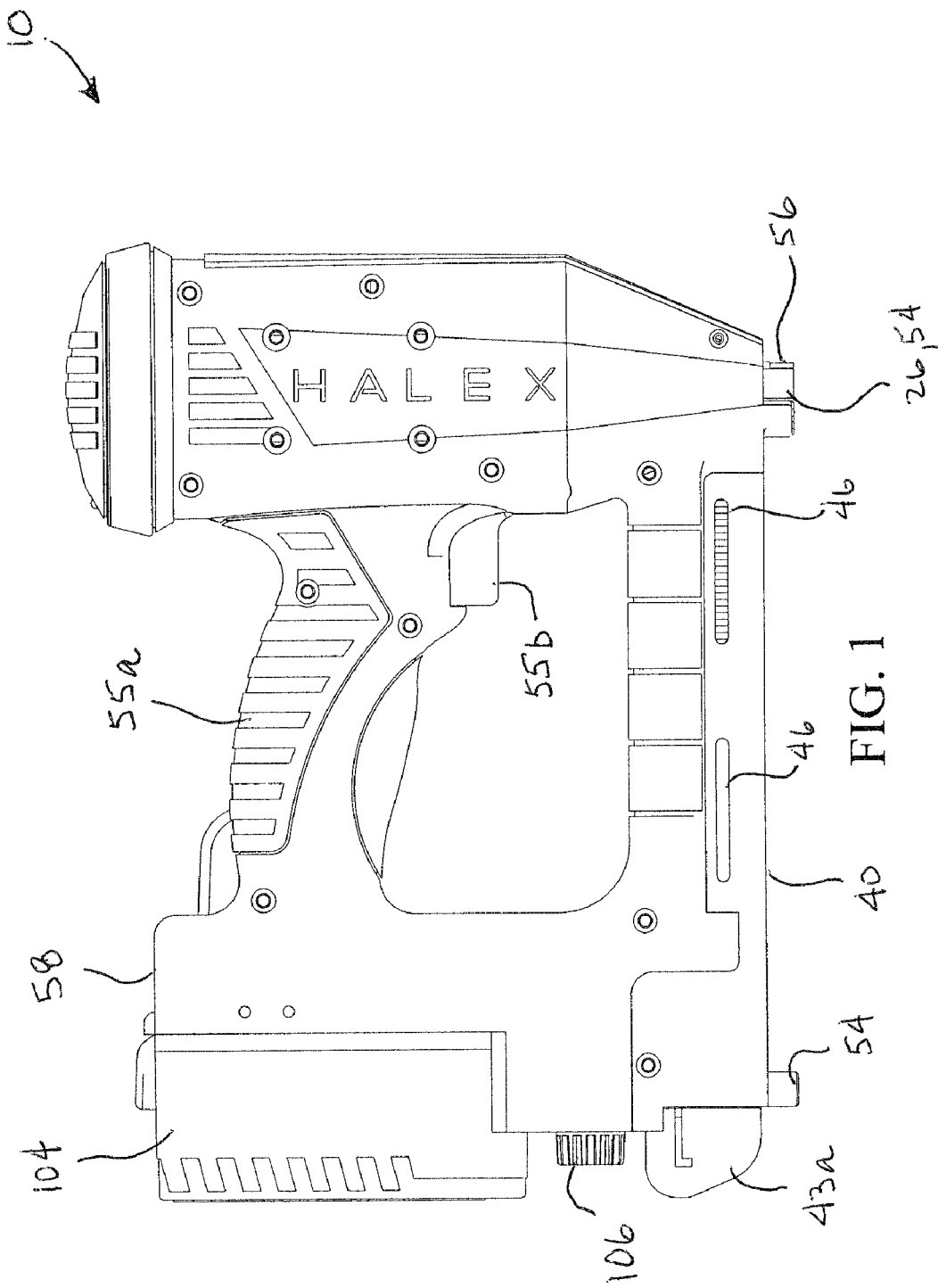
FIG. 1 is a side view of an exemplary embodiment of the fastener driving device of the present invention.
Figure 3:
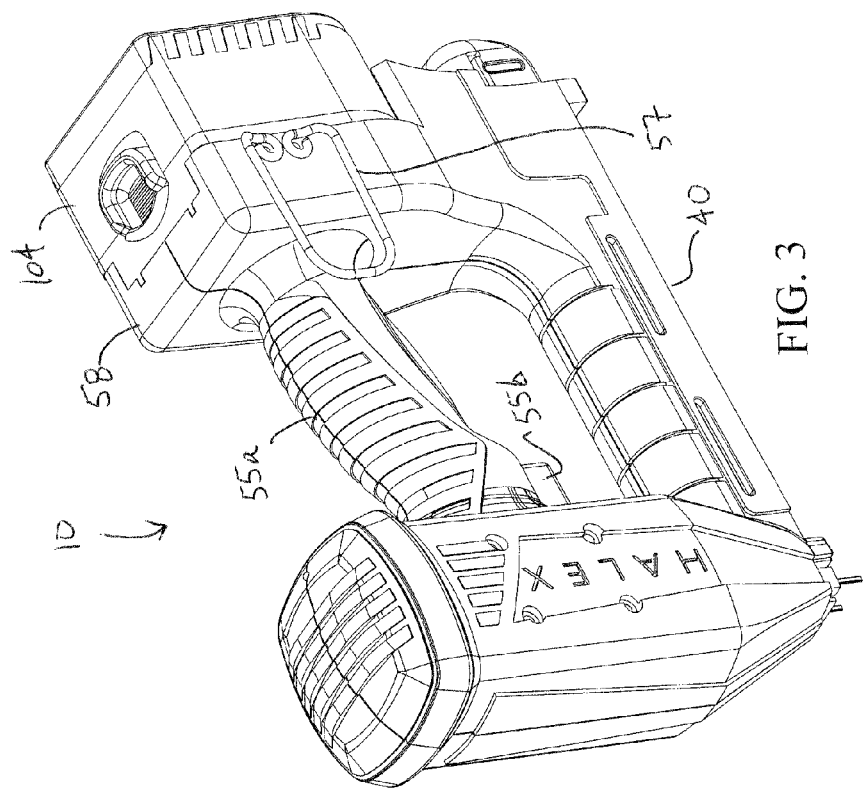
FIG. 3 is a top perspective view of the device shown in FIG. 1, in accordance with an exemplary embodiment of the present invention.
Figure 2:
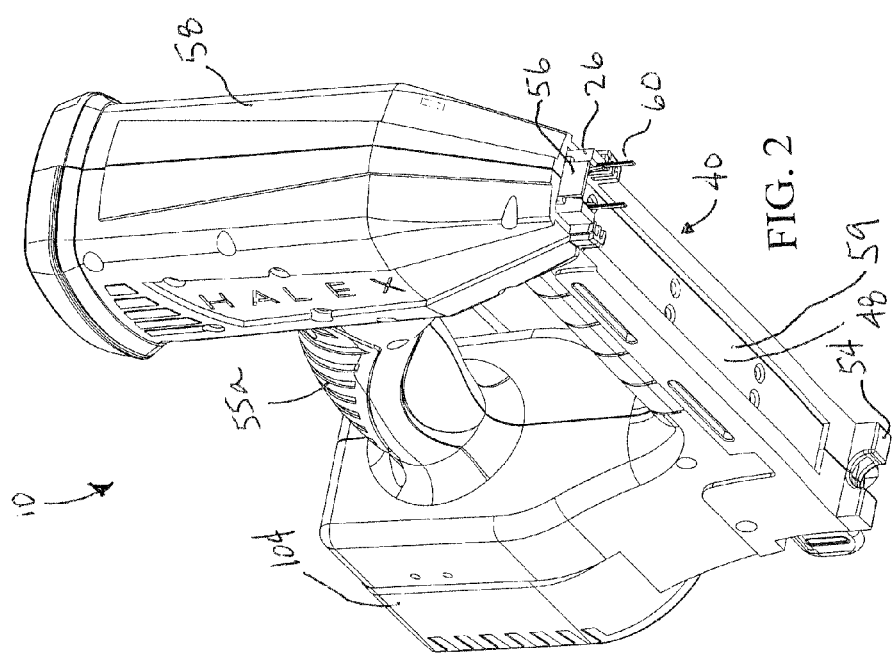
FIG. 2 is a bottom perspective view of the device shown in FIG. 1, in accordance with an exemplary embodiment of the present invention.
Figure 4:
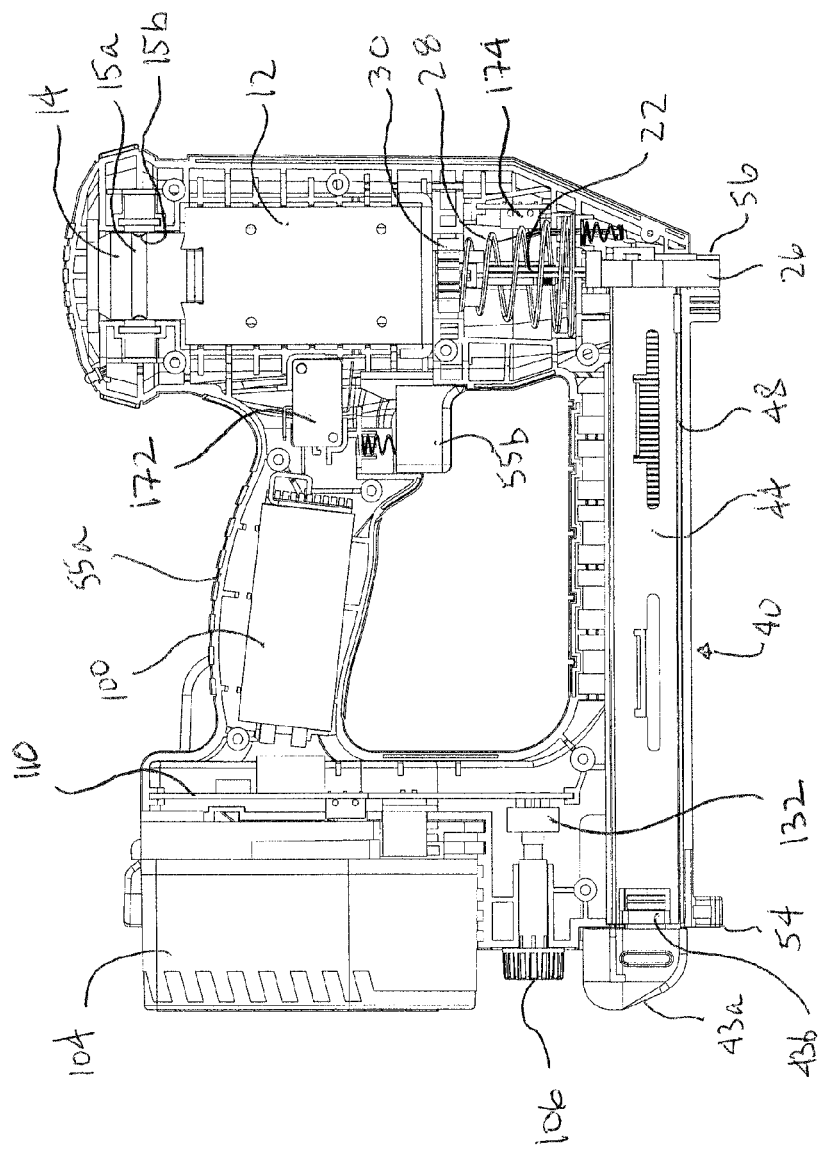
FIG. 4 is an internal side view of the device shown in FIG. 1, in accordance with an exemplary embodiment of the present invention.
Figure 5:
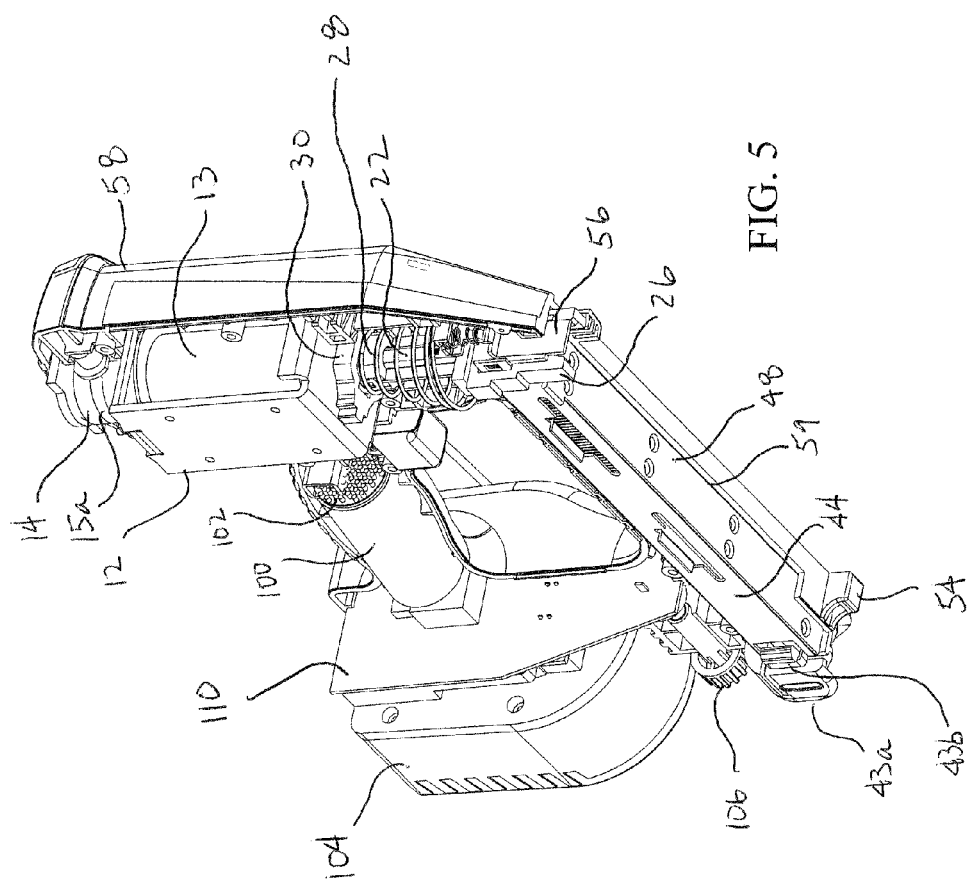
FIG. 5 is a perspective side view of the device shown in FIG. 1, showing internal components thereof, in accordance with an exemplary embodiment of the invention.
Figure 11:
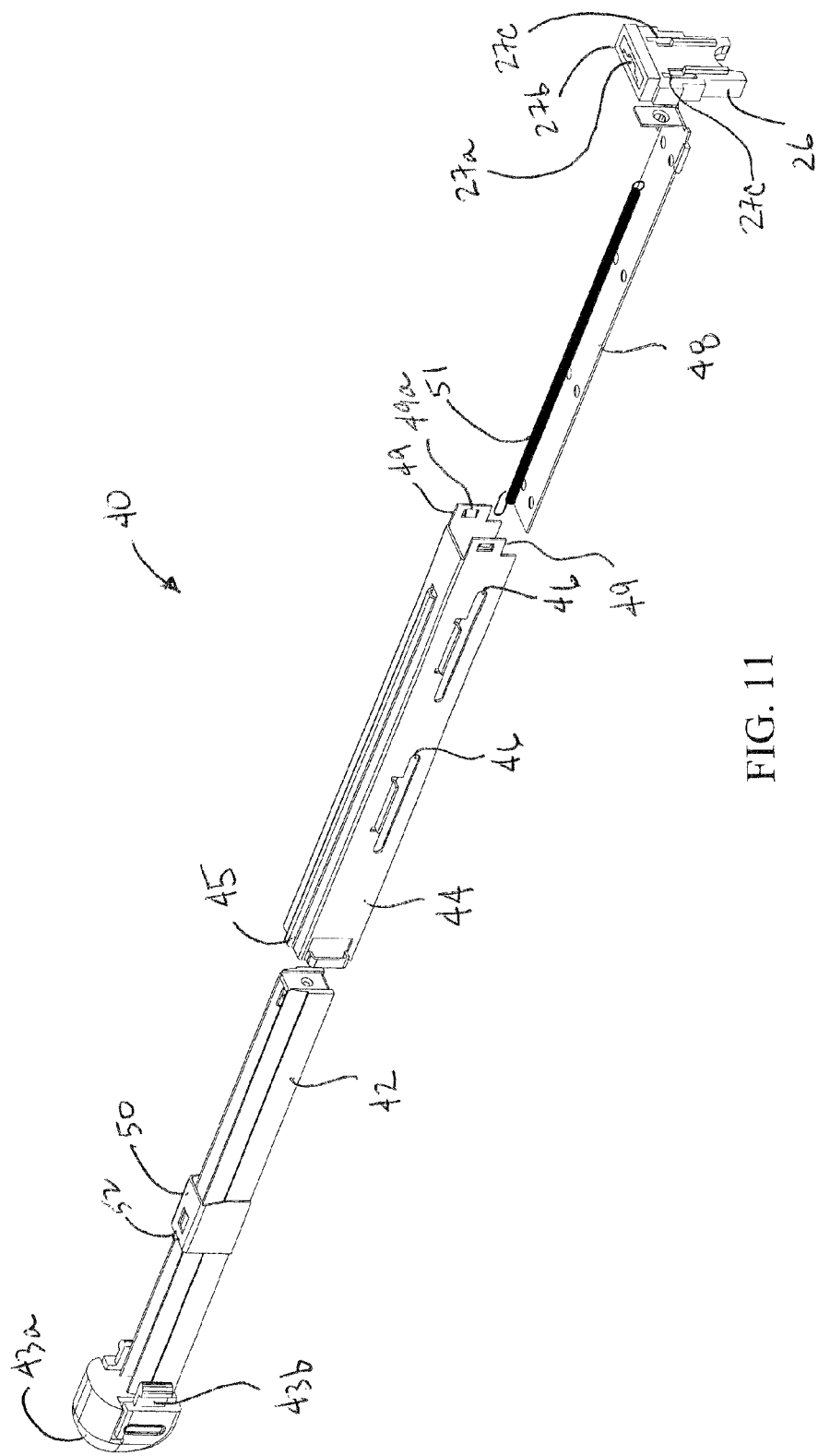
FIG. 11 is an exploded view of the fastener housing, in accordance with an embodiment of the device disclosed in FIG. 1.
Figure 12:
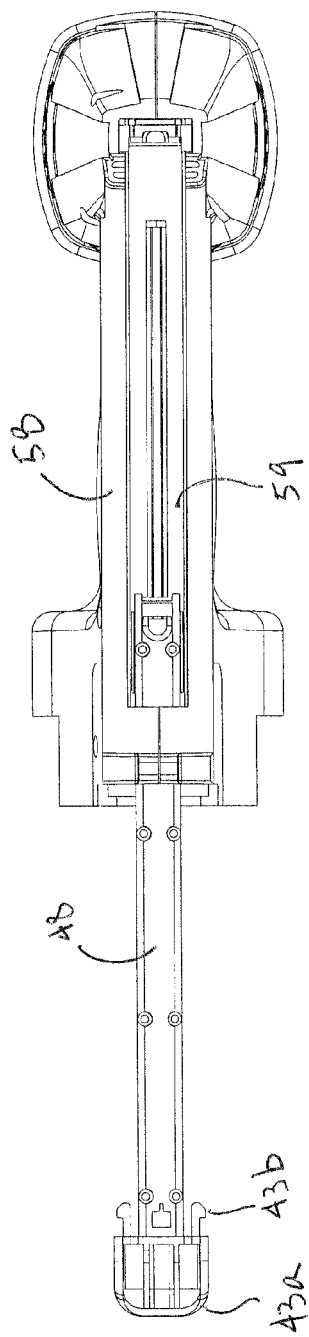
FIG. 12 is a bottom view of the device showing the main rail partially removed, in accordance with an embodiment of the device shown in FIG. 1.
Figure 14:
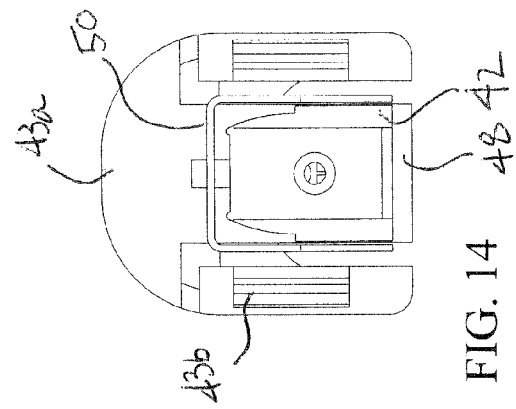
FIG. 14 is an end view of the main rail, in accordance with an embodiment of the device shown in FIG. 1.
Figure 13:
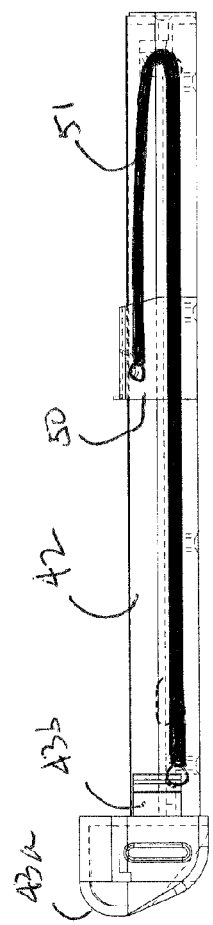
FIG. 13 is side view of the main rail showing the spring engaged with the pusher, in accordance with an embodiment of the device shown in FIG. 1.

A fastener driving device 10 is generally discussed herein, which may operate from a DC power source and is capable of discharging fasteners at elevated power levels, at quicker cycle times, and over an extended period of time on a single power source charge. Device 10 may be a stapler, a nailer, or any other fastener driving device.

In an exemplary embodiment, as shown in the FIGS. 1-26D, device 10 comprises a direct current (DC) powered stapler 10. The DC-powered stapler 10 is capable of driving staples at reduced cycle time intervals, such as between two (2) and three (3) seconds when fully charging and discharging a 360 volt, 1200 uF (microfarad) flash capacitor. In another embodiment, the cycle time is approximately around 1.5 seconds when fully charging and discharging a 180 volt, 1200 uF capacitor. Further, on a single battery charge, the device 10 is capable of making well over 900 shots with a 12-cell 14.4 volt Ni-Cad battery pack, which is generally well over 2 days of work for a commercial user. The number of shots may increase when using a similar Li-ion battery.

In this exemplary embodiment, device 10 is also capable of driving staples that comply with UL 2239 requirements, including withstanding the 7.2 pull test, which requires the driven staple to remain intact for 5 minutes while being subjected to a 50 pound load. To achieve this, the device 10 generally provides higher power to effectively drive staples to appropriate depths in softer or harder target mediums ("work pieces"), such as, for example, Douglas fir and yellow pine (a hard stud-grade wood). Such staples, in particular embodiments, may include staples having at least a $9/16$ inch leg height.

To effectively perform in commercial conditions, the device 10 may be capable of discharging staples into various target work pieces (herein after referred to as "work pieces"), such as varieties of wood, plastic, and composite joists, framing, studs, and other structures to secure various target objects, such as cables, conduit, and wire. Because staples may need to be driven into objects that are more or less resistant (i.e., harder/denser or softer/less dense), device 10 may provide elevated driving power, which may be variable. In other embodiments, device 10 may be capable of storing and discharging nails (nails and brad nails) and other driven fasteners.

In particular embodiments, the fastener driving device 10 utilizes a solenoid 12 and a high voltage capacitor 100 to drive insulated and non-insulated staples into a desired object. The fastener driving device 10 may also utilize other drive-generating sources, such as, for example, a fly wheel, a compressed spring, a pneumatically or combustion driven piston, to drive the fasteners.

In one embodiment, device 10 generally includes a solenoid 12, a drive assembly 20, a fastener housing 40, a high voltage capacitor 100, a power source 104, control circuit 110, and a body 58.

Device 10 may generally utilize a solenoid 12 to drive a fastener, such as an insulated or non-insulate staple. As shown in FIG. 6, solenoid 12 generally includes a coil 13, a ferrous slug referred to as an armature (or plunger) 14, and a pushrod 16. When electrical current is passed to solenoid 12, the coil 13 is energized. Subsequently, the energized coil produces a magnetic field that attracts armature 14 inward toward the center of the magnetic field (i.e., the coil). This causes pushrod 16 to translate downward, which provides the force transferred to the drive assembly 20 for driving a target fastener into a target work piece. The strength of the magnetic field and the corresponding plunger driving force may be increased or decreased by increasing or decreasing the voltage, respectively. Each solenoid generally includes a maximum stroke, which is the maximum distance an armature 14 or pushrod 16 may travel in any one direction. It is contemplated that a solenoid may have an end stroke end that provides a stroke distance that is different than the maximum stroke. Further, the end stroke may be adjustable. In one example, the end stroke is specified to end at the coil's maximum magnetic field. If the armature 14 travels beyond the intended end stroke or position, it may be pulled back by the coil if desired. A stop 18 may be included within the solenoid housing to limit the stroke and protect the housing from armature 14 impact. In one embodiment, stop 18 is a spring or bumper formed of a resilient elastic material.

In one embodiment, device 10 may include an armature-retention mechanism to maintain armature in a ready-position, in which the armature 14 awaits deployment towards coil 13 for fastener discharge. In one embodiment, the armature-retention mechanism comprises a retaining groove 15*a* located along a surface of armature 14, and one or more spring-loaded ball bearings 15*b*, located within housing 58, that engage retaining groove 15*a* when armature 14 is in a desired position, such as a ready-position (ready to fire). This allows armature 14 to be retained in a pre-firing position away from the solenoid's coil 13. This may aid in preventing unintentional staple discharge or separation. Further, such mechanism may retain the armature 14 in a ready-position when the coil is initially energized, so that armature 14 is not drawn toward the coil 13 in a gradual manner. Instead, attractive forces build between the coil 13 and armature 14 until the forces are able to overcome the retention forces applied by the spring-loaded ball bearings 15*b*. Upon release by the ball bearings 15*b*, a sling-shot effect may be achieved. This causes the armature 14 to be immediately released at a higher force which increases the driving force and momentum provided by pushrod 16. Finally, by utilizing a spring-loaded retention means as described herein, a user does not have to release the armature, but rather, the armature 14 is release automatically when the solenoid-generated force overcomes the spring forces. It is contemplated that other means may be used to retain armature 14 in a position, such as spring-loaded clips, resilient gaskets or clips, or other mechanical or electromagnetic means.

Drive assembly 20 engages pushrod 16, and transfers the force and momentum generated thereby to discharge a target fastener. As shown in FIG. 6, drive assembly 20 includes a striker 22, striker guide 26, return spring 28, and plunger coupling 30. Plunger coupling 30 mechanically associates striker 22 with pushrod 16. As the force generated by pushrod 16 is transferred through coupling 30, striker 22 is forced downward through the striker guide 26. Ultimately, a bottom edge 23*a* of striker 22 contacts a target fastener, such as a staple, for discharge. If the fastener is part of a clip, striker 22 causes the target fastener and any insulation associated therewith to shear from the clip.

Striker 22, in one embodiment shown in FIGS. 7-8, is the component that engages a target fastener via a bottom edge 23, and discharges the target fastener into a desired work piece. Striker 22 operates within striker guide 26 by virtue of a track 27*a*, which extends longitudinally along striker guide 26. Staples or fasteners are discharged outwardly from a bottom of striker guide 26, by way of track 27*a*. Striker 22 is constrained within track 27*a* by retention member 27*b*, which slides over the top of striker guide 26 and about striker 22. It is contemplated that side portions of track 27*a* may extend into guide 26, so that striker 22 is constrained within track 27*a* by guide 26, without use of member 27*b*. Arrangements other than those discussed may also be used to guide striker 22 along a track between pre-firing and discharged positions.

Traditionally, staples strikers 22 have provided linearly flat bottom edges 23. This generally allows the flat bottom edge 23 of striker 22 to evenly apply a driving force across a flat staple bight (or crown) 84. However, it may be desirous to provide a more shaped staple (insulated or non-insulated) 60, 80 when securing particular target objects to a work piece. Therefore, is may be desirous to deform a staple (insulated or non-insulated) 60, 80 about a target object, such as cable, conduit, wire, or the like. This may occur while the staple 60, 80 is being driven into the work piece. The deformed staple may improve securement of the target object by providing a shape having more contact surface area for resisting any movement of the target object, while reducing the likelihood of damaging the target object if the staple is overdriven, as the force is now dispersed along a larger area.

To provide a deformed driven staple (insulated or non-insulated), the bottom edge 23 of striker 22 may include, or form, a desired shape. In one embodiment, the bottom edge 23 includes an arcuate shape to allow the staple to form about the object being secured. It is contemplated that the shape of bottom edge 23 may be symmetrical or asymmetrical, or may comprise any desirous shape, such as, without limitation, an arc, a half-circle, or a triangle (i.e., an inverted V-shape), or may comprise an asymmetric, linearly-inclined (guillotine) edge. One purpose of this asymmetric striker bottom edge 23 may be to increase the shear force applied to the staple and/or insulation, for improved shearing of the staple and/or insulation from a strip or clip. An asymmetrically arcuate or inverted V-shaped striker 22 combines the benefits of the asymmetric striker, with the benefits of a shaped staple to provide a staple that can better conform to the shape of a target object while potentially reducing the amount of power needed to shear any staple or insulation for discharge.

Figure 19A:
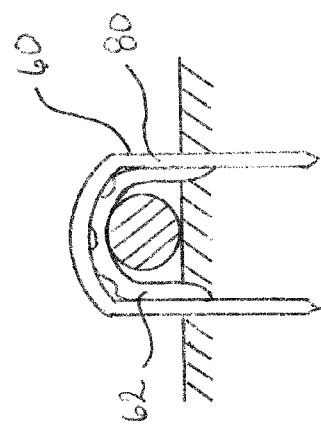
FIG. 19A is a side view of an insulated staple driven into a work piece to secure a target object, in accordance with an embodiment of the present invention.

When the shaped striker 22 engages a staple (insulated or non-insulated) 60, 80, the shaped bottom edge 23 engages the staple bight 84. Bight 84 may be deformed generally into the shape of bottom edge 23, or some other shape that is desirable. For example, if a bottom edge 23 having an inverted V-shape does not form a staple bight 84 into the inverted V-shape, it may instead form the bight section 84, or a portion thereof, into a more rounded shape. The ability of a staple 60, 80 to deform, and the extent thereof, is in part dependent upon the material and design of staple 80 and any insulation 62, and the resistance provided by the target object. It is contemplated that bottom edge 23 may be approximately as wide as or wider than the width of staple 60, 80 (i.e., the width of bight 84); however, it is contemplated that bottom edge 23 may have a width less than the staple 60, 80 width. A discharged insulated staple 60 is shown in FIG. 19A, in an exemplary embodiment, where it is shown to have been driven into a work piece by a shaped striker. The insulated staple 60 is also securing a target object. A non-insulated staple 80 would look similar to FIG. 19A, except that no insulation 62 would be present so to allow staple 80 to instead engage the target object.

Striker 22 may also include a gusseted portion 24 that extends along a length (height) of striker 22, and outward from a transverse plane of striker 22. This gusseted portion 24 increases the column strength of striker 22 to better resist any buckling of striker 22 under the high forces generated by this device 10 the to drive the target fasteners. Forces experienced by the striker 22 may vary, according to the power provided by the capacitor 100, which may depend on various factors, such as the hardness of the target medium, the desired fastener drive depth, and whether the striker 22 is to bend or deform a discharged staple about the target object that the staple is securing.

Striker guide 26 provides a bottom edge 26*a* for engaging a medium targeted to receive a discharged fastener. This bottom edge 26a provides a point of contact between the target medium and device 10, which allows a user to forcefully direct the device 10 against the target medium in anticipation of fastener discharge. The engaging bottom edge 26a may be non-linear, in that the bottom of the guide 26 may include a recessed shape or shapes 26b, which may be similar to a shape of the striker bottom edge 23. This recess may allow a target object that is to be secured by the fastener to enter the guide 26 and align the target object between the legs of a discharging staple, which may prevent any potential damage to the target object. In this instance, the recess 26b is an alignment guide 54, as discussed below. Further, full consumption of the target object within the recess 26b may allow the bottom edge 26a of guide 26 to continue its engagement with the work piece. Finally, placement of a target object within the recess 26b may allow the target object to engage a safety blade 56, which closes a safety switch 174. Safety switch 174 may have to be closed before a staple can be discharged. Device 10 may still remain in contact with the underlying work piece for driving support. Striker guide 26 may also guide a fastener deployed from its stored position through complete discharge and engagement with the target work piece.

Coupling 30, in one embodiment shown in FIGS. 9-10, comprises a block 32 that accepts a terminal end of pushrod 16. Pushrod 16 may be secured within block 32 by any acceptable means, such as, for example, an adhesive, a fastener or pin, friction, or any other mechanical interference. A ridge 33 may be included to engage and constrain pushrod 16 within block 32. In one embodiment, a clip 34 is inserted through apertures in block 32 to engage flanges 25 of striker 22. Flanges 25 allow clip 34 to constrain striker 22 within the drive assembly 20, and returning striker 22 to a ready position after staple discharge. It is contemplated that other known or unknown means of operably coupling striker 22 to pushrod 16 may be used, such as, for example, a pin, bolt, bracket, or weld.

Spring 28 operates to return the pushrod 16 and armature 14 to a ready position, which may include the engagement of ball bearings 15b with retaining groove 15a. In one embodiment, spring 28 is a compression spring that extends below coupling 30, and operates between coupling 30 and the striker guide 26. Spring 28 may be a tapered spring, which reduces the compressed height of the spring 28 and, consequently, may reduce the overall height of device 10. In other embodiments, spring 28 may be located in other places, such as near the top of solenoid 12 or armature 14. Spring 28 may also be a torsion spring or an extension spring, which may be located, for example, atop solenoid 12 in association with armature 14 or between coupling 30 and solenoid 12.

Typically, in an effort to drive fasteners into tight spaces and to provide improved visibility of fastener alignment and discharge, striker guide 26 may be located close to the front tip of stapler/device 10. This is often called a blunt nose orientation. In one embodiment, generally shown in the FIGS. 1-5, the longitudinal axis of the solenoid 12 (or the pushrod 16) generally extends in a vertical direction within device 10 and is generally perpendicular to the main rail 42, or parallel to the direction of staple discharge. Because the solenoid 12 is much wider than pushrod 16, it may be difficult to discharge staples at or near the front-most tip of device 10, which may make it difficult to discharge fasteners in tight or abutting locations. In an embodiment exemplarily shown in FIG. 6A, a cantilever 36 may generally extend from the pushrod 16 in a transverse (lateral or longitudinal) direction of device 10, towards the front of the device 10 to move striker 22 and the fastener discharge closer to the tip or front of the device 10. Consequently, when pushrod 16 is actuated, the displacement of the pushrod 16 is transferred to striker 22 via cantilever 36. Cantilever 36 may comprise a coupler extending between striker 22 and pushrod 16 or may comprise an arcuate striker 22, which may be flexible. In an alternative embodiment, the solenoid 12 may be inclined with regard to the main rail 42, or the direction of staple discharge. This orientation could eliminate the need for the cantilever 36, or in the very least, require an arcuate or angled mechanism to transfer the driving force to the fastener to allow the fastener to engage the work piece perpendicularly. The arcuate or angled mechanism, which may be flexible, may comprise striker 22 or another mechanism.

Fasteners are generally contained within a fastener housing 40. Housing 40 comprises a design that provides both structural integrity and rigidity, and interchangeability. In one embodiment, shown in FIGS. 11-14, housing 40 may store insulated and/or non-insulated staples and includes a removable main rail 42 that operates within a cavity defined by top rail 44 and the bottom of the body 58. Top rail 44 generally attaches to striker guide 26 by way of tabs 49, which are inserted into apertures 27c of striker guide 26, and secured by way of clips 49a. It is contemplated that any other known means, such as fasteners, adhesives, or the like may be used to secure tabs 49 to striker guide 26. A removable fastener may also be used to more easily remove striker guide 26 from device 10. In one embodiment, a de-sta-co clamp or the like may be used to removably secure top rail 44 to striker guide 26.

In particular embodiments, bottom plate 48 is attached to the bottom of main rail 42, and may support insulated and/or non-insulated staples stored along the main rail 42. Main rail 42 generally maintains the staples, whether the staples are in a unified clip or independently exist along main rail 42. Spring 51 maintains pusher 50 in forceful engagement with the staples along main rail 42, and forcefully directs the staples into a series of insulated and/or non-insulated staples, and towards the striker 22 for discharge. Pusher 50 may include a tab 52 that operates within a groove 45 of top rail 44, where the translation of tab 52 and, therefore, pusher 50, is maintained along a single path defined by groove 45. It is contemplated that other means may be used to direct or control the translation of pusher 50.

Fastener housing 40 may also include windows 46 to visibly determine if, and approximately how many, fasteners remain in device 10. In one embodiment, at least two windows are located along at least one of the opposing longitudinal sides of top rail 44. Although each window 46 may be capable of displaying any desired number of staples, in one embodiment each window 46 is capable of displaying 22 staples. In one embodiment, fastener housing 40 is capable of storing 97 staples. In this embodiment, a window 46 is positioned along the length of top rail 44 so that a maximum of 17 staples may remain hidden within housing 40, that is between the window 46 and the striker guide 26. Therefore, when the staples housed within housing 40 are no longer visible in a window 46, the housing 40 is capable of accepting two standard 40-count staple clips (or one standard 80-count clip) since housing 40 is capable of holding 97 staples (2-40 count clips equals 80 staples, plus the maximum of 17 remaining equates to a maximum of 97 staples, which is within the capacity of housing 40). This concept and strategy may be employed with any capacity housing 40. Further, any number of windows 46 may exist, which may also be located at any location along housing 40.

In one embodiment, housing 40 may be capable of storing and discharging insulated and/or non-insulated staples. In achieving this dual capability, in one embodiment, non-insulated staples may rest along a top surface of bottom plate 48, while insulated staples may rest along a top surface of main rail 42. It is also contemplated that insulated and non-insulated staples may both rest on either the top 42a of main rail 42 or on the bottom plate 48. Because these surfaces may have to resist the shearing forces applied by striker 22 to staples for separation and discharge, it may be desirous to form these surfaces or elements from, or provide additional elements made from, harder or more durable materials. Accordingly, bottom plate 48 and at least a top portion 42a of main rail 42 may be formed of steel, or any other durable metal or plastic to improve the durability of device 10 by better resisting the forces applied by striker 22.

In other embodiments, separate staples and staple insulation may be inserted into housing 40 to ultimately provide a driven insulated staple. In these embodiments, the staples and insulation may be stored separately within housing, where the insulated staple is formed at the time of discharge, or each may be stored together (with or without being attached to one another) for ultimate discharge. Insulated and non-insulated staples may be accepted individually or as a plurality in clip form. To provide this capability, a single pusher capable of pushing both the staples and insulation may be provided, or a separate pusher may be provided for the insulation.

Because various types of fasteners may be used in device 10, it is contemplated that housing 40 or a portion thereof, such as the main rail 42, may be removable so to provide interchangeable magazines containing different types of fasteners. This allows a user to quickly remove a first magazine that is empty or that contains one type of fastener, such as insulated staples or brads, and quickly insert a second magazine that is full or that contains a second type of fastener, such as non-insulated staples. In one embodiment, main rail 42 and top rail 44 are removable, such as a single magazine unit, by detaching top rail tabs 49 from striker guide 26.

In the embodiment shown in the figures, the fasteners may be inserted into the housing 40 either through an aperture 59 in the bottom of body 58, or directly onto the main rail 42, when main rail 42 is retracted from top rail 44. Loading the fasteners into the body aperture 59 is commonly referred to as bottom loading. Aperture 59 may also be useful in providing access for the removal of any fastener jams occurring near or within the striker guide 26.

The exterior end of the main rail 42 may include a grip 43a to better grasp and retract main rail 42. One or more clips 43b may be included to secure the main rail 42 to device 10 for operation of device 10. The internal end remains open for the purpose of exposing fasteners into striker guide 26 for engagement with striker 22. In other words, pusher 50 directs the fasteners toward the internal end of main rail 42 to ready a fastener for discharge. Top rail 44 may coordinate with striker guide 26 to achieve an integrated housing 40.

In one embodiment, device 10 may include a low staple sensor 108a that may determine if there is a low quantity, and/or no quantity, of fasteners remaining within fastener housing 40. It may be desirous to know whether the housing 40 is empty, to prevent any dry firing (firing without a fastener) to prevent damage to device 10 and/or any target object adjacent the fastener discharge of device 10. This sensor may comprise any sensor capable of sensing staples within sensor housing 40, and may be, for example, an optical or physical sensor. In one embodiment, sensor 108a is a physical sensor that engages staples through an opening 108b in fastener housing 40. If there is not staple to engage, sensor 108a indicates such to control circuit 110. Upon indication, control circuit 110 knows how many fasteners remain, and will count the quantity of subsequent fastener discharges to determine when no fasteners remain. When determining that no fasteners remain, control circuit 110 will prevent the stapler from firing until staples are replaced.

Along the bottom side of the driving device 10 where fasteners are discharged, there may be any number of alignment guides 54 that function to align the fastener with respect to a target object, such as a cable, conduit, wire, pipe, etc. The alignment guides 54 may also serve to grip the cable, etc. so that the user can pull a target cable, wire, or the like taught prior to deployment of a fastener, for the purpose of eliminating any slack in the target object. Today, electricians have to pull on the cable prior to and independent of securing the cable with a staple. Therefore, the guides 54 would assist users by eliminating a step in the process and freeing a hand for other uses.

In particular embodiments, striker guide 26 extends outwardly beyond the bottom side of the stapler 10 to include a recess 26b, which functions as, or forms, an alignment guide 54. In one embodiment, a guide 54 positions a target object relative to a staple discharge, so to direct the discharged staple legs about a target object, and thereby reducing the chance that the discharged staple would damage the target object, which may be an object, such as a cable or wire, being secured to a work piece. In other embodiments, guides 54 may align a target object for the purpose of driving a fastener through the object, such as for securement thereof, which is different than protecting the object from fastener penetration. Further, guides 54, including striker guide 26, may be removable to allow the use of different guides, which may be specifically used in association with different types of target objects or different applications. In particular embodiments, striker guide 26 may comprise multiple interconnected segments, wherein one segment includes an alignment guide 54, which may be removable. Still further, removable fastener magazines (discussed below) may include different guides 54 for use with specific fasteners or applications. For example, device 10, or a removable fastener magazine, may include guides 54 for use with specific fasteners for securing specific specifically securing, for example, low voltage wires, such as Category 5—Cat 5, Co-ax, and telephone wires, metal clad (MC), armored cable (AC), or flexible metallic conduit (FMC), Electrical Metallic Tubing (EMT), rigid conduit, PVC conduit, or copper or PVC water pipe. Device 10 may also include laser guides to improve a user's ability to align the device 10 with a target object or target work piece. Finally, device 10 may include a sensor that determines whether a target object is centered within a guide 54. This guide 54 may be located near the staple discharge. A specially contoured or narrow safety blade 56 may accomplish this function and therefore become this centering sensor.

As shown in FIGS. 1-5, a safety blade 56 may be provided and located along the bottom side of the stapler 10, which may trigger a safety switch 174 before firing device 10. This may help to ensure that device 10 is properly aligned and/or engaged prior to firing. In one embodiment, blade 56 is located near or adjacent to an alignment guide 54 or striker guide 26. This better allows blade 56 to verify that the target object is most appropriately aligned with the fastener to be discharged. It is contemplated, however, that safety blade 56 may be located in other desirous locations.

In one embodiment, blade 56 has a linearly flat bottom edge that extends across the width of a target object. Therefore, blade 56 may extend across the width of an alignment guide 54, a striker guide 26, or a striker guide bottom edge 26b. By providing this flat blade design, blade 56 will recognize any object within striker guide 26 or alignment guide 54, regardless of whether the object is narrower that any such width, and regardless of whether any such object is centered within such width. For example, a narrower or pin-like safety blade 56 may not recognize a narrower object located within striker guide 26 or alignment guide 54. Of course, it is contemplated that a differently shaped bottom blade bottom edge, or a narrower blade design, may be desirous, such as when one desires that an object be specifically located within guide 54, such as being centered or off-centered, or to recognize only certain types of objects within guide 54. Alternative bottom edges include, without limitation, arcuate or linearly angled edges.

It is contemplated that after safety switch 174 is initially triggered, multiple fastener shots may be deployed, or, it may be required that safety switch 174 be reset and re-triggered after a single shot to prevent accidental subsequent discharges. It is also contemplated that safety blade 56 and safety switch 174 may operate in a "bump" mode, which allows the user to hold down the trigger and fire the gun just by depressing the safety blade 56. In one embodiment, the securing of cables and the like does not include "bump" mode, as it is may be dangerous and not required for such application.

The internal components of the stapler 10 may be contained in a body 58, which may generally form a shell (or compartment) and include an ergonomically designed handle. The body 58 may comprise a pair of mating halves or portions, a clam shell, or any other number of interconnecting portions. Device 10 may also include a handle 55a, which may be formed as part of body 58, or may be separately manufactured for attachment to body 58. Device 10 generally includes a trigger 55b to initiate a trigger switch 172 for fastener discharge. The trigger 55b is located in the vicinity of the handle 55a, and in one embodiment, is ergonomically located along a bottom, front portion of the handle 55a for ease of use and to better facilitate single hand operation of the device 10. The body 58 may be formed of plastic, or any other desired material, in whole or in part. Of course, the body 58 may also be formed of multiple materials, as certain materials may be desired in certain areas, such as the handle portion 55a. It is contemplated that overmolding, or any other process similar in result, may be used to add or include decorative or functional features or materials to desired portions of the body 58. One such example includes applying overmolded EPDM and/or TPE to the handle 55a for improved gripping performance and reducing the impact energy transmitted to the user. Device 10 may also include a belt clip 57, which may be mounted on either side of body 58, as desired by a user of device 10.

Figure 24:
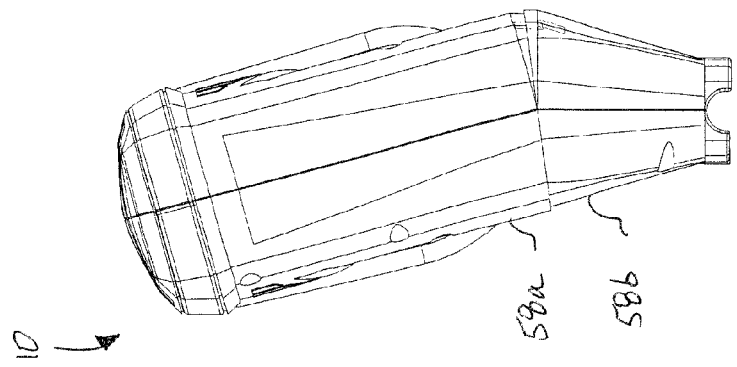
FIG. 24 is an end view of an embodiment of the device shown FIG. 1, made in accordance with the present invention, where the device is capable of tilting side-to-side.
Figure 23:
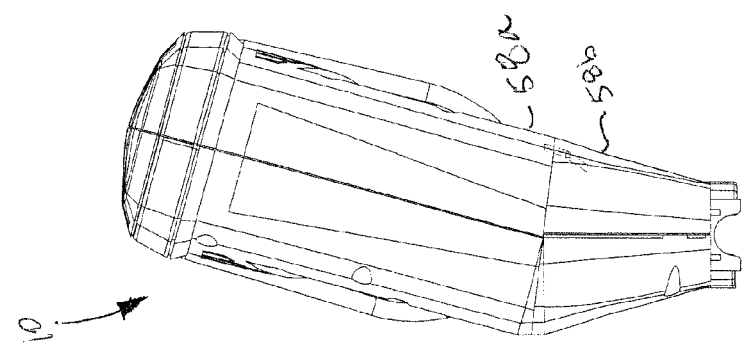
FIG. 23 is an end view of an embodiment of the device shown FIG. 1, made in accordance with the present invention, where the device is capable of tilting side-to-side.

In particular embodiments, shown exemplarily in FIGS. 23-24, it is contemplated that the device 10 may pivot sideways to lower its effective height or to otherwise the device 10 to enter tight spaces, such as closely positioned studs. Accordingly, device 10 includes a top portion 58a that tilts or rotates in relation to a bottom portion 58b. To achieve this, pivotable joints may exist between top 58a and bottom 58b, and a flexible striker 22 and/or a flexible or rotatable coupling may exist within drive assembly 20 to allow striker to engage a staple in any tilted or untitled position of body 58. It is contemplated that top portion 58a may rotate any amount in relation to bottom portion 58b, for example, without limitation, +/−15°. Not only does this provide entry into tight spaces, it also allows the fastener to be discharged normal to the target or the bottom of device 10. This may be achieved internally by using a flexible striker 22 or pushrod 16, or a flexible plunger/striker coupler. In the alternative, it is contemplated that the device 10 may pivot from front to back, which may reduce the effective width of the device 10, while the fasteners may or may not discharge at an angle with regard to the receiving surface/object.

As mentioned above, in one embodiment, the fasteners used in driving device 10 are staples. In the embodiments of device 10 shown in the figures, the driving device is capable of storing and discharging both non-insulated staples 80 and insulated staples 60. In other embodiments, driving device 10 may be limited to discharging either insulated 60 or non-insulated staples 80. The staples 80, which may be used to form insulated staples 60, may comprise any commercially available staples, or may be specially designed for use in a particular device 10. In the embodiment shown in the figures, insulated and non-insulated staples 60, 80 may be provided as individual staples, or in clip form.

Insulated and non-insulated staples 60, 80 are generally discharged from device 10 into a target work piece to secure a target object thereto. In the embodiment shown, driving device 10 utilizes insulated and non-insulated staples 60, 80 to secure any commercially available sheathed or unsheathed cable or wire, such as, without limitation: 14-2, 14-3, 12-2, 14-4, 12-3, 12-4, 10-2, 10-3, stacked (two) 14-2, stacked (two) 12-2 NM wire (Romex); Cat-5; and other low voltage wire. It is also contemplated that device 10 may utilize staples or other fasteners to secure conduit or pipe, or any other similar product, such as, without limitation: armored cable and conduit (MC, AC, and FMC); EMT; rigid conduit; PVC conduit; and/or copper or PVC water pipe, or any other similar product(s).

As stated above, the one embodiment of device shown in the figures is capable of discharging both insulated and non-insulated staples 60, 80. As shown in exemplary embodiments in FIGS. 16-22, insulated staples 60 generally comprise an insulation form 62 and a staple 80, with the form 62 being placed in cooperative association with the staple 80. Insulated staples 60 may exist individually or with a plurality of other staples 60 in the form of a clip 61. While clip 61 may be assembled from a plurality of individual insulated staples 60, in one embodiment, clip 61 is formed by associating a strip of insulation forms 64 with a strip of staples 82.

Referring to the embodiments shown in FIGS. 16-22, insulation forms 62, whether in individual 62 or strip 64 form, are generally placed in association with a staple 80, and more specifically, with the underside of the staple bight 84. It is contemplated that any suitable material, such as plastic, polymer, elastomer, metal, paper or cardboard, or composite may be used. In one embodiment, insulation 62, 64 comprises injection molded thermoplastic or molded elastomer. In particular embodiments, forms 62, 64 comprise nylon 66, nylon 11, nylon 12, or acrylonitrile butadiene styrene (ABS). In particular embodiments, insulation 62, 64 is made of electrically non-conductive material.

As suggested earlier, insulators 62 may be produced as individual segments for use with individual staples 80, or may be formed into strips 64 comprising a plurality of joined and separable insulator forms 62. Each of the forms 62 may be designed to generally correspond to an individual staple 80, whether the staple 80 is alone or part of strip 82. In particular embodiments, the thickness of insulator 62 is equal to or less than the thickness of staple bight 84. Consequently, in particular embodiments, an insulation strip 64 may include a quantity of forms 62 that is equal to the quantity of staples 80 in a staple strip 82. Further, in particular embodiments, the length of insulation strip 64 may be substantially the same as a corresponding staple strip 82, where substantially the same includes insulation strips 64 that are shorter than staple strip 82 by less than the thickness of a staple 80, since tolerances or offsets located at one or both ends of insulation strip 64 may provide a slightly shorter length of strip 64 even though strip 64 still includes a quantity of forms 62 substantially equal to, and in alignment with, the staples 80 in strip 82. Therefore, it is contemplated that insulation strip 64 may manufactured for use with any commercially available staple strip 82. Due to the differences in tolerances between the staples 80 and the insulators 62, it may be desirable to limit the number of insulators 62 produced within a strip 64 to maintain or control strip dimensions. In particular embodiments, strip 64 includes between 25-50 forms 62. In more specific embodiments, strip 64 includes 40 insulation forms 62.

Each insulation form 62 generally includes a crown 66, and a pair of legs 68 extending there from; however, it is contemplated that form 62 may only include a crown 66 without one or more legs 68. The crown 66 may correspond to the bight 84 of staple 80, while legs 68 may correspond to legs 86 of staple 80. Insulation form 62 may include deformation voids 70, which, for example, may be contained within form 62 or located along a surface thereof. In one embodiment, one or more deformation voids or recesses 70 are located along an upper surface of crown 66. Voids 70 may comprise notches or grooves that allow the form 62 to bend and contort so it may adapt to the cable, wire, or other target that is being secured by an insulated staple 60. The voids 70 allow the insulation form 62 to be made from more durable and harder materials, which otherwise may not appropriately bend without the inclusion of voids 70. In one embodiment, three voids 70 are equally spaced across crown 66, where one void is located near the center of crown 66 to encourage crown deflection about the central void 70, and one void 70 is located near each leg 68 to encourage further deflection of the crown and deflection or translation of the legs 68 in relation to crown 66. However, it is contemplated that no voids may exist, or that one or more voids may exist along crown 66. In one embodiment, each void 70 comprises an approximately 0.025 inch half circle; however, other sizes and shapes may be used to form each void 70 and to achieve the desired deflection, which may be based on the amount of driving force. Further, the sizes may vary, such as, for example, according to the material used to create each form 62. It is contemplated that the shapes of voids 70 may include, without limitation, half circles or ovals, squares, triangles, and rectangles.

The bottom side 72 of crown 72 is shaped to deter any abrasion or cutting of the target object to be secured by the staples. The area between the bottom side 72 and each of the legs 68 may include a gusset 74. Gusset 74 controls deflection and aids in deterring any tearing of the insulation form 62 during deflection, such as between the crown 66 and legs 68. Gusset 74 may comprise any sized shape, which may include, for example, a radiused or linearly angled form (i.e., a triangle) extending between the bottom section 72 or crown 66 and each leg 68.

At the bottom of each leg 68 is a tip 69. Each tip is designed to be sufficiently pointed, in an attempt to avoid any buckling of each leg 68 as it enters the target work piece. The target work piece may be any desired target that the staple is to enter and secure to, such as, for example, wooden, plastic, concrete, or composite studs or planking. It is contemplated that legs 68 may not exist, or that legs 68 may be sufficiently short so that each is not necessarily capable of entering the target work piece. Further, it is not necessary that insulation form 62 be symmetrical, as asymmetrical geometry or deflection may be desired based upon an oddly shaped target object or target work piece.

In a strip 64, each form 62 may be spaced from each adjacent form 62 by a particular spacing 78. The value of spacing 78 is selected so to substantially align, as desired, each form 62 with each corresponding staple 80. Generally, forms 62 are centered along the width of staples 80; however, other non-centered alignments are contemplated. Connectors 76 may extend between adjacent forms 62 to assemble an array of insulator forms 62 into a strip 64. Connectors 76 may comprise one or more extensions (as shown in the figures), or connectors 76 may comprise a continuous or discontinuous thin band that extends about the boundary between adjoining forms 62. Connectors 76 also align each form 62 with each corresponding staple 80 as desired. In an alternative embodiment, each form 62 may substantially abut each adjacent form 62 without the use of connectors 76, meaning that each of the crown 66 and/or legs 68 may be directly attached to an adjacent crown 66 or leg 68, respectively. Finally, each leg may have a tapered width, where each such taper corresponds to a draft angle 79. This may improve the removal of insulation form 62 or clip 64 from a mold. Also, by thinning the cross-section closer to the crown 66, deflection may be better controlled as deflection may be directed to the thinner cross-section, which has a lower bending modulus.

As stated above, the individual forms 62 may be interconnected via one or more connectors or joints 76. Connectors 76 generally extend between forms 62, and may include a cross-section that is sized and shaped to adequately allow a form 62 to shear from (i.e., detach from) a strip 64 when engaged by a stapler device for discharge. In the embodiments shown in the figures, connectors 76 are projections, each of which have a cross-sectional area of approximately 0.0003 square inches; however, it is understood that this area may comprise any area, as such area will vary with the material used to form connector 76 and the amount of shearing force exerted by the stapler device 10. Further, connectors 76 may comprise any shape and any length desired for an application. In one embodiment, connectors 76 may constant or variable cross-section that includes one or more shapes, such as, for example, a square, rectangular, triangular, circular, semicircular, or oval. Further, connectors 76 may extend between the individual forms 62 in a linear, angular, arcuate, or V-shaped (or inverted V-shaped) direction.

In various embodiments, insulators 62 may be extruded and include a U-shaped or V-shaped profile, and/or having legs that flare out. It is also contemplated that the insulators 62 may be insert molded, wherein the staple clip 82 is inserted into a mold (such as a thermoplastic or thermoset mold) and the insulation form material is injected about the staples to form insulation in association therewith. If insulation 62 can be formed discreetly on each staple, this may reduce and/or eliminate the need to shear insulator 62 upon discharge from a fastener discharge device, such as device 10. It is contemplated that the insulator 62 may be solely applied to the underside of the crown or to both the top and underside.

It is contemplated that a perforating wheel may be run over the insulation strip 64 before or after application to the staple (s). The perforating wheel may puncture the strip 64 numerous times at each junction to reduce the amount of shearing force required for separation and discharge. This may occur within the stapler 10 or before insertion into stapler 10, such as during or subsequent to the manufacturing of insulation strips 64 or insulated staple strips 61.

In one embodiment, insulated staples 60 are prefabricated, meaning that insulation forms 62 are associated with or attached to staples 80, before being loaded into device 10. In forming an insulated staple 60 or clip 61, an insulation form 62 or strip of insulation 64 may be placed in association with, or frictionally, mechanically, and/or adhesively affixed to, a staple 80 or strip of staples 82. For example, the insulation may be non-adhesively placed within or in association with the staples, such as within the stapler. Further, the insulation may be press-fit into the staples, clipped or interference fit to the staples, or the staple legs may be inserted into apertures located within the insulation.

In one embodiment, insulation 62 or an insulation strip 64 is adhesively affixed to a corresponding staple 80 or staple strip 82. Attaching insulation 62, 64 to staples 80, 82 may be desirous to maintain the alignment and association between insulators and staples during discharge. Generally, adhesive 90 may be applied between the staples 80 or strips 82, and the insulation 62 or strips 64. In one embodiment, one or more beads of adhesive may be located longitudinally between the bight 84 of the staples 80 and the crown 66 of insulation 62. One or more beads of adhesive may be located longitudinally between one or more staple legs 86 and insulation legs 68. In one embodiment, the adhesive is Loctite 326™ and the beads are approximately 0.060 inches wide. However, the adhesive may comprise any other known temporary or permanent adhesive suitable for maintaining insulation 62 or strips 64 in positional association with staples 80 or strips 82. Further, the size, quantity, and location of adhesive may vary as desired to achieve a desired attachment. For example, one or more beads or coatings may extend between staples 80, 82 and insulation 62, 64. It is also contemplated that the adhesive may be applied to one or more of the insulation forms 62, strips 64, staples 80, or strips 82, and may extend in a continuous or discontinuous manner.

When a strip of insulation 64 is placed within staple strip 82, the insulation 64 may be specifically placed so that each insulation form 62 is aligned with an individual staple 80. To assist in this alignment process, tabs or spacers 77 may extend outwardly at each end of the insulation strip 64 to a desired distance. The desired distance may provide an offset distance 78 from the end of the staple strip 82, or it may extend to coincide with (i.e., extend flush with) the end of the staple strip 82, so that each insulation strip 64 is approximately the same length as each staple strip 82. The strips 64 may also contain pre-molded or extruded guides that may assist in aligning the strips within the staple clip, such as by providing transverse ridges that may align with the transverse grooves or partitions existing between adjacent staples 80 along strip 82.

In another embodiment, insulated staples may not be prefabricated prior to being inserted into any device 10, and instead, staples 80, 82 and insulation 62, 64 may be independently loaded into the stapler 10. In this instance, the staples 80, 82 and insulation 62, 64 may subsequently become engaged or associated with each other before, during, or after staple discharge. In this embodiment, the insulation may be supplied as a strip, as coiled or an in-line strip, or any other known manner.

Staples 80, which may be included within staple strip 82, may be formed of metal, plastic, or any composite material. As mentioned above, staples 80 and strips 82 may be specifically designed for a device 10, or may comprise any commercially available staple or staple strip. In one embodiment, staple 80 comprises a continuous member having a bight 84 and a pair of legs 86 extending there from. Staple 80 does not have to be formed from a single continuous member, and may instead be assembled from multiple members, which is also true for insulation form 62. The transition between bight 84 and each leg 86 generally forms a corner 88 that may be radiused. This radius may be relatively small, such as, for example, 1/32 of an inch, to deter any buckling of an associated leg 86. It is contemplated that staples 80 may comprise any size and shape. For example, staple lengths may comprise, without limitation, lengths of ¼" (inch), ⅝", ½", or 9/16",
while staple widths may comprise 0.4" to 0.67". The staple material may comprise any cross-sectional size, and, in one embodiment, comprises material that is 0.075" wide and 0.035" thick. Generally, for any given staple, the greater the staple material cross-section and/or the deeper the staple is to be driven, more power that a device 10 must provide to achieve the desired drive depth. In one embodiment, device 10 drives a staple that is 0.670" and 9/16" long, and formed of 0.075" wide and 0.035" thick material.

Staples 80 also include a tip 88 for engaging and penetrating a target work piece. This tip 88 may form an arrow-like tip, where biased edges extend from opposing sides of the staple and converge centrally along the thickness of leg 86 to form a central point as shown in FIG. 19. It is also contemplated that staple may be a divergent point staple, in which the point of the tip 88 is formed along a different side edge of each leg 86, as opposed to being formed centrally. It is contemplated that each tip 88 may have a different point type, and that one tip may be asymmetric with regard to the other tip 88, or maybe opposite of or otherwise different than the other tip 88.

Staple strips 82 generally contain a plurality of staples 80. Generally staples 80 may be assembled in a substantially abutting relation and joined by an adhesive, but other means may be used. Heat may also be applied to cure or set the adhesive, and pressure may be applied to condense and align the plurality of staples into strip form. Further, staples, whether in individual or strip form, may be coated with a grip compound, which improves a discharged staple's ability to resist a removal force—a force that attempts to remove the staple from the medium into which it has been discharged. Examples of possible grip compounds include any commercially known or used compounds or adhesives. In operation, the adhesive properties may be activated while the staple is being driven into the target work piece, as penetration may cause friction, which in turn generates heat to activate the adhesive or bonding properties.

It has been disclosed that, in one embodiment, the driving force is provided by a solenoid 12. Solenoids are advantageous since they are capable of providing higher driving forces while also being capable of quickly firing and returning to a ready position. Further, solenoids are electrically operated. These advantages are desirous in heavy duty industrial applications, especially since electronic devices may become portable with the use of batteries. However, solenoids require increased electrical power to generate higher drive forces. And when desiring to also provide a portable device, a DC source, such as a battery, may generally be used. This provides difficulty since the size of a battery is limited when being used for a portable, hand-held device. Consequently, the limit in size also limits the battery's storage capacity. This ultimately affects and controls the degree of power that may be provided over an extended duration, because the battery should be capable of providing enough power and charge life to adequately generate the elevated drive forces in the solenoid for a minimum amount of charge cycles. Otherwise, the portable hand-held device is not desirous to a user.

A capacitor 100 is generally used to supply the requisite energy to the solenoid 12 in a DC powered device. In one embodiment, the capacitor is a high voltage capacitor. The supplied energy is used to charge the coil, which in turn magnetically drives an armature 14, and, thereby, drives a pushrod 16 for fastener discharge. When it is desirous to quickly and repeatedly fire the solenoid, such as within 1.5-3 seconds, the capacitor must also quickly and repeatedly charge and discharge. This provides a problem, as capacitors generate heat when they are charged and discharged. This problem is exacerbated when repeatedly charging and discharging (a "charging cycle") a capacitor, but even more so when the charging cycle occurs are higher or increasing rates. If using ordinary high voltage capacitors to operate at approximately 20 second charging cycles, the capacitors will rapidly fail after approximately a few hundred charging cycles due to the heat. The use of ultra-capacitors or super-capacitors may generally provide adequate energy storage capabilities, as each provides high volume storage; however, ultra and super caps are limited to significantly slower charge and discharge rates. Therefore, it is desirous to use a capacitor that is both capable of storing an adequate amount of energy, and quickly and repeatedly charging and discharging while generating lower amounts of heat.

In one embodiment, a flash or photoflash high voltage capacitor 100 is used to provide stored energy to solenoid 12. A flash capacitor is capable of quickly charging and discharging, and storing elevated amounts of energy for heavy duty applications, while generating less heat due to lower internal resistance. Flash capacitors are also better able to withstand higher heat. However, photoflash capacitors are generally used in photography flash applications, where the flash capacitor provides energy to a flash tube having near zero impedance (internal resistance). In this application, the flash capacitor 100 will be used to provide energy to a solenoid having relatively high impedance, as the solenoid tends to resist any movement from its pre-firing (ready) position. In one embodiment, a flash capacitor having at least 1,000 microfarad (uF) is used. Flash capacitors that may be used may provide well over 1400 uF. In these embodiments, flash capacitor 100 may have a charging capacity of at least 180 volts; however, in one embodiment, the voltage is approximately between 330 and 390 volts. In another embodiment, a 360 working volt (390 peak volt), 1200 uF flash capacitor is used. All capacitance values may be approximately 10% higher to account for manufacturing tolerances. For a flash capacitor operating at approximately 1200 uF and 360 volts, the flash capacitor provides upwards of approximately 78 Joules of energy (energy equals 0.5×(capacitance×voltage squared). However, it is contemplated that device 10 may be used in lighter duty applications, and therefore, the capacitor may operate at levels below those identified above. For example, in lighter duty uses, it is contemplated that a 330 volt flash capacitor having 400-800 uF of capacitance is used. Regardless of the capacitor being used, it is contemplated that a light duty application may be charge a capacitor to 180 volts or less, as each any capacitor may be charged below a full charge. It is contemplated that capacitors having lower or higher voltages and/or capacitance may be used, as the applications and operating conditions for device 10 may vary. In particular embodiments, to a more durable device 10 having a longer life expectancy, flash capacitor 100 may be a high temperature capacitor, which has a temperature rating between 85-110 degrees Celsius, although it is contemplated that higher temperature rated capacitors may be used. It is contemplated that lower temperature rated capacitors may be used, especially in lighter duty applications. For a capacitor rated at 110 degrees Celsius, device 10 may be capable of performing on average approximately 100,000 firing cycles performed continuously at approximately 19 second intervals. Therefore, a flash capacitor 100 may be successfully used in this heavier duty application to repeatedly fire the solenoid 12 at quicker cycle times over longer periods of time.

Figure 15:
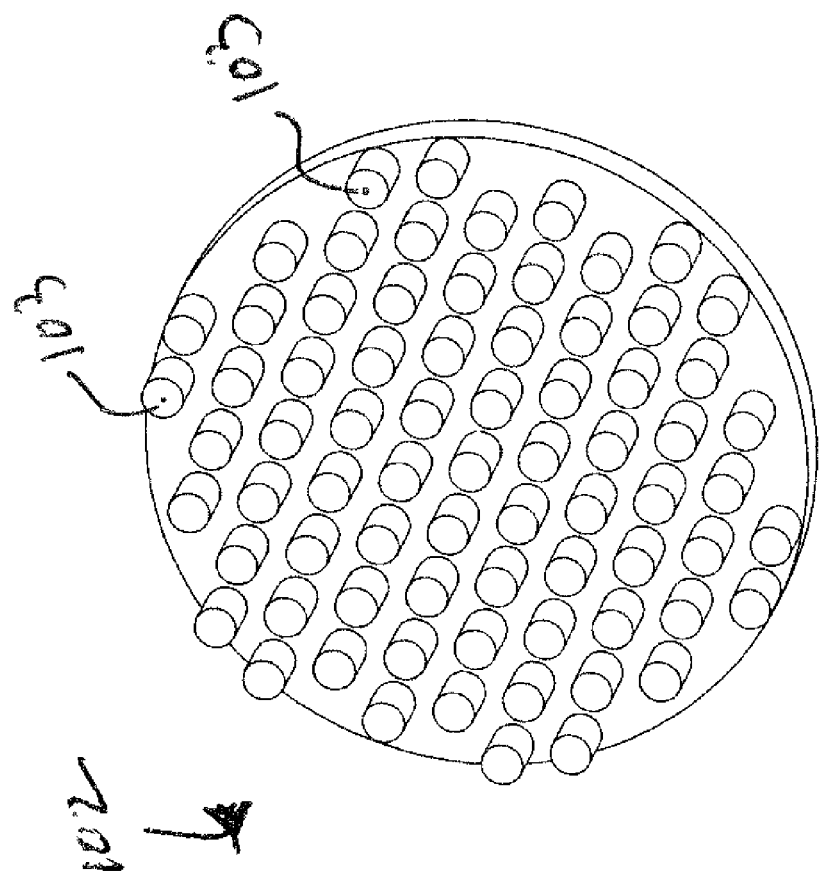
FIG. 15 is a perspective view of the heat sink, in accordance with an embodiment of the device shown in FIG. 1.
Figure 17:
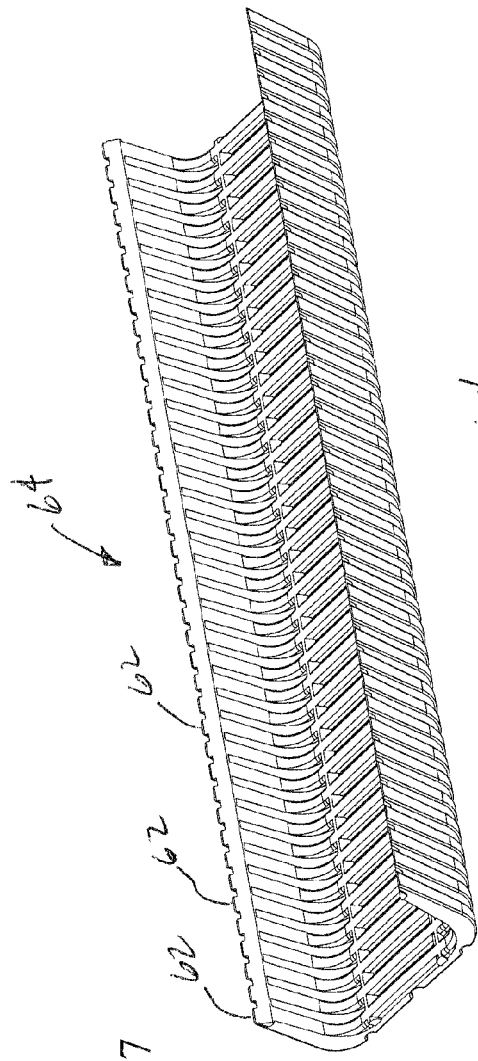
FIG. 17 is a perspective view of a staple insulation strip, in accordance with an embodiment of the present invention.
Figure 18:
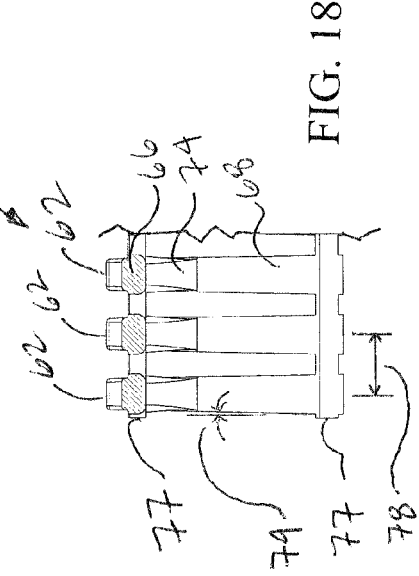
FIG. 18 is a cross-section view of the staple insulation strip shown in FIG. 17 where the cross-section is taken through a deformation void, in accordance with an embodiment of the present invention.
Figure 16:
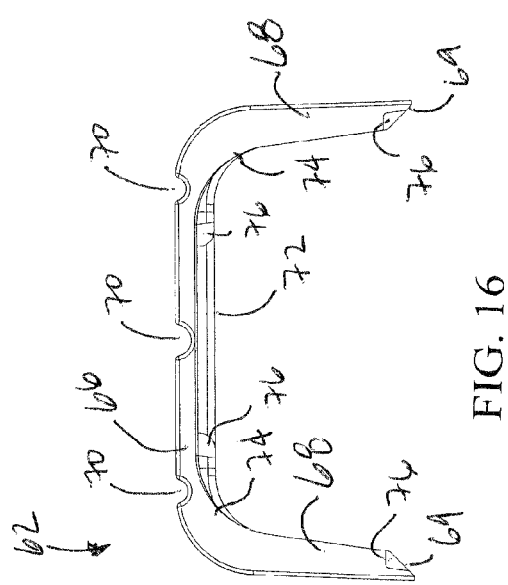
FIG. 16 is a side view of a staple insulation form, in accordance with an embodiment of present invention.

A heat sink 102, as shown in FIG. 15, may be used in conjunction with flash capacitor 100 to further reduce the heat of the capacitor, and therefore increase solenoid 12 firing cycle time. Even though flash capacitor 100 provides improved charging and discharging rates while generating significantly less heat, heat is still generated. Therefore, a heat sink 102 may be used to conduct heat from capacitor 100, thereby allowing capacitor 100 to generate more heat that would otherwise be detrimental to the performance and durability of capacitor 100. Heat sink 102 may include heat dissipating protrusions 103 and may be made from any heat conducting material, such as, without limitation, aluminum.

Control circuit 110 is generally provided in device 10, such as on a circuit board, to communicate electricity between battery 104, capacitor 100, and solenoid 12 and to perform various functions with regard to device 10. To take advantage of and improve upon the capabilities and advantages provided by solenoid 12 and capacitor 100, circuitry 110 may include features that improve the charging and discharging rate of capacitor 100, and the repeated firing of solenoid 12. Other features may be included within circuitry 110 that improve the operation of device 10. An embodiment of control circuit 110 is shown in FIGS. 26A-D. The functions and results of control circuit 110 are described herein in accordance with exemplary embodiments of the present invention, and in no way limits the inventors to these exemplary embodiments, as it is understood that alternative methods and circuitries, whether hard or soft logic, may exist to accomplish the spirit of the present invention.

In one embodiment, control circuit 110 includes a high voltage generation circuit 120. This circuit 120 converts the DC voltage provided by battery 104 to a higher voltage for charging high voltage capacitor 100, which may be a flash capacitor. Accordingly, circuit 120 includes a transformer 122. Circuit 120 also controls the charging of capacitor 100, and consequently may include related circuitry or logic to increase the charging rate of flash capacitor 100, and to reduce the energy loss within circuit 120. Such circuitry is represented generally, in an exemplary embodiment, by charge controller 124. The high voltage generation circuit 120 quickly charges a high voltage capacitor 100, which in turn quickly releases stored energy to drive solenoid 12. In this exemplary embodiment, charge controller 124 comprises an LT®3750 controller, which is a proprietary product of Linear Technology ("LT") and is believed to be protected at least in part by U.S. Pat. Nos. 6,518,733, 6,636,021, and 7,292,005, the disclosure of each such patent, in its entirety, is hereby incorporated by reference. In this embodiment, high voltage generation circuit 120 is capable of fully charging a 360 volt, 1200 uF flash capacitor between 2 and 3 seconds, or charging the same capacitor to 180 volts within approximately 1.5 seconds. The quick firing and recharging allows for frequent use by a user. In another embodiment, controller 124 may be a flyback converter, which is used to rapidly charge larger capacitors, such as flash capacitor 100. It is contemplated that other capacitor charging circuits, as well as high current capacitive charging circuits, may be used in device 10 to control the charging of capacitor 100, and to achieve increased charging rates.

It is contemplated that it may be desirable to vary the driving power of solenoid 12, such as when desiring to drive fasteners into harder or softer materials. To achieve this, a variable power control 132 may be used, which may be operated manually by a dial 106, to vary the charge of capacitor 100. In one embodiment, the variable power control is a potentiometer, which may vary the voltage within voltage control circuit 130. It is contemplated that other means of adjusting power, known to one having ordinary skill in the art, such as, for example, a variable resistor, may be used. In one exemplary embodiment, as shown in voltage control circuit 130, a power switch may be included with potentiometer 132 for turning device 10 on and off. In this embodiment, a signal generated by by potentiometer 132, such as, for example, a change in voltage, may be recognized by microcontroller 140. If microcontroller 140 identifies an increase in voltage from potentiometer 132, a signal is sent to high voltage generation circuit 120 to increase the charge of capacitor 100 accordingly (increased charge of capacitor 100 relates to an increase in solenoid 12 drive power). This signal may be a step function, which may be filtered by R6 and C7 and adjusted by R7 as necessary. If the microcontroller 140 identifies a drop in voltage, a signal is sent to a bleeder 150 to lower the voltage level in capacitor 100, if the stored energy is above the desired amount. It is contemplated that an insulated gate bipolar transistor (IGBT) may be used instead of an SCR (silicon controlled rectifier) (T2) or thyristor 112 to cause current to flow from capacitor 100, as the IGBT can control power output by limiting or interrupting the discharge of capacitor 100, which would terminate the supply of current or charge to solenoid 12. This would allow for a quicker recharge of capacitor 100 since capacitor 100 is not entirely drained. In one embodiment, a monostable multivibrator, such as Motorola's MC14538 (a dual precision, retriggerable, resettable, monostable multivibrator) may provide a specific period of time for an IGBT to remain open. It is contemplated that other methods may be used to vary and control the power of device 10.

Figure 25:
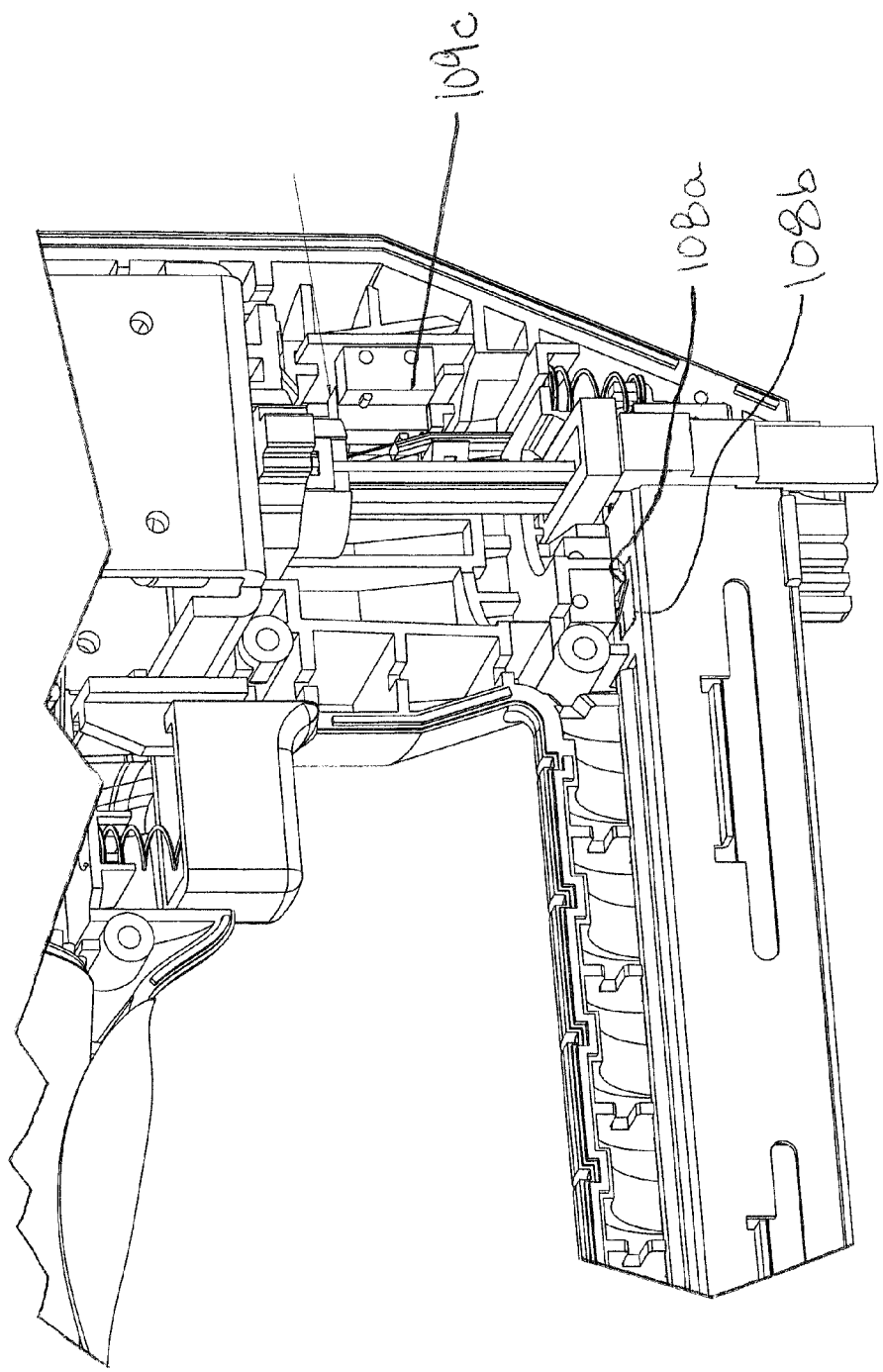
FIG. 25 is a top-side perspective view of an embodiment of the device shown FIG. 1, made in accordance with the present invention, showing a variable power sensor capable of varying power based upon the height of a target object to be secured, and a low staple sensor.
Figure 25A:
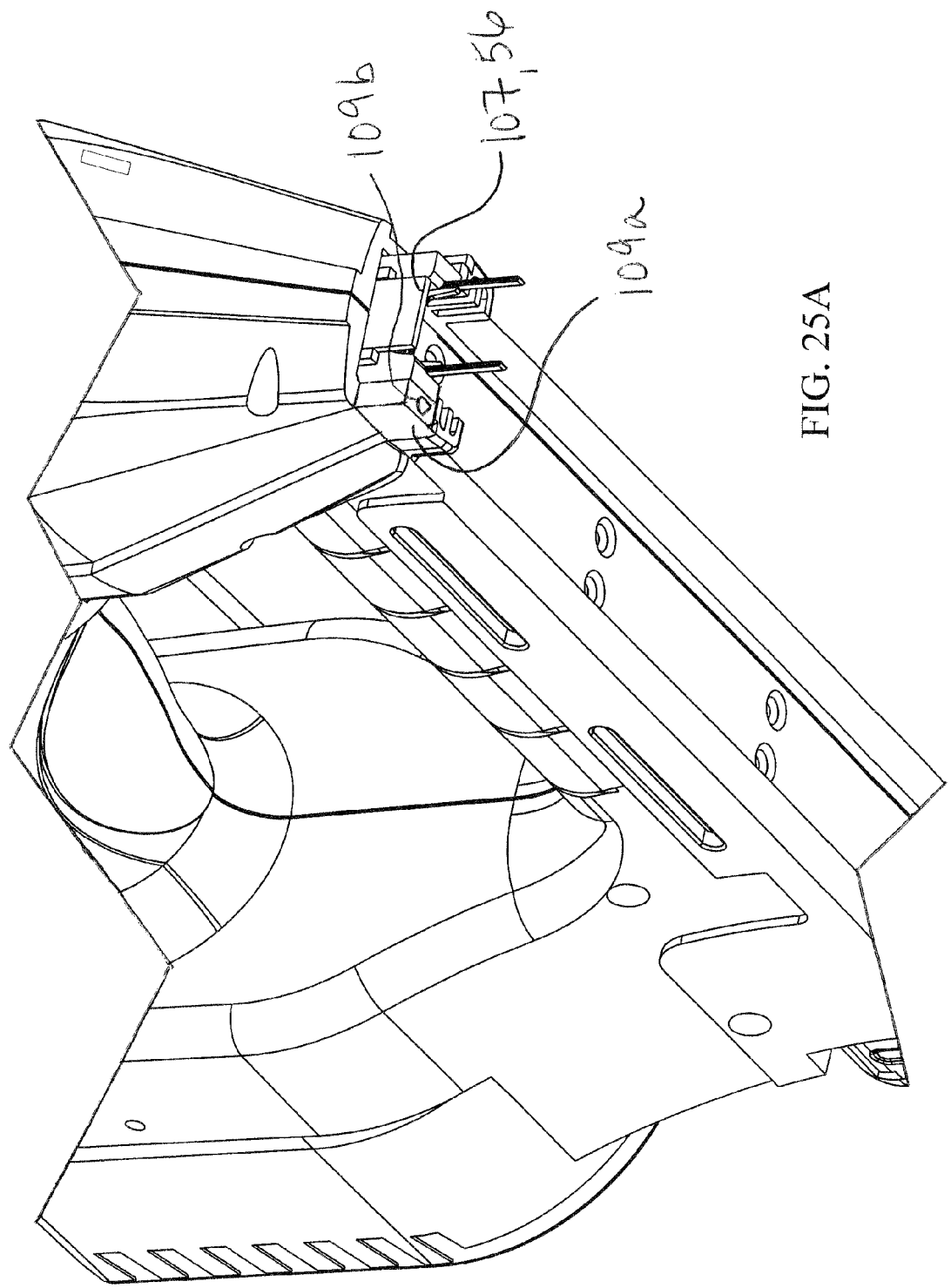
FIG. 25A is a bottom-side perspective view of an embodiment of the device shown FIG. 1, made in accordance with the present invention, where the device includes variable power sensors that are capable of varying power based upon work piece hardness and/or the height of a target object to be secured.
Figure 26A:
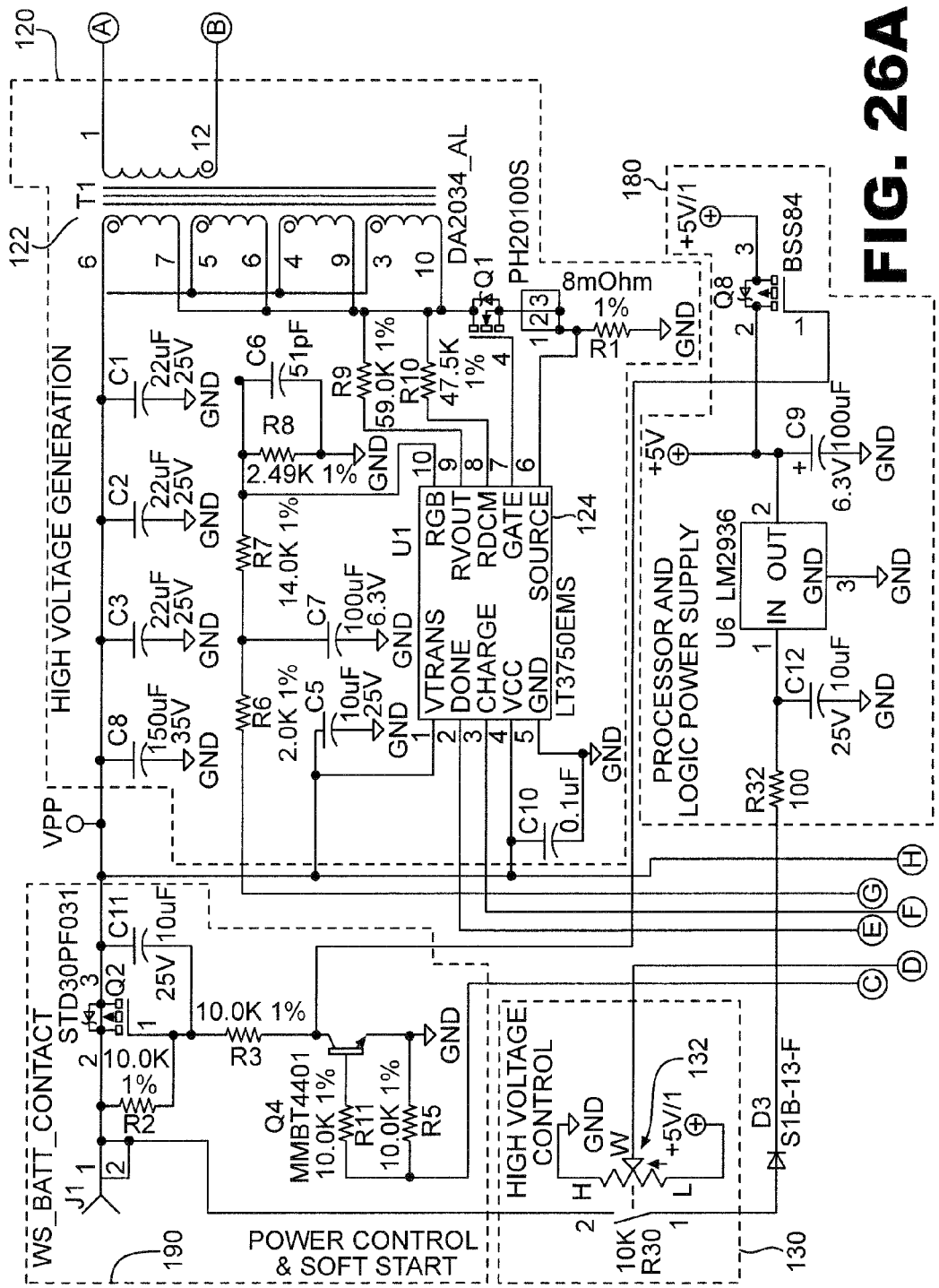
FIGS. 26A-D is a view of a control circuit in accordance with an embodiment of the present invention.
Figure 26B:
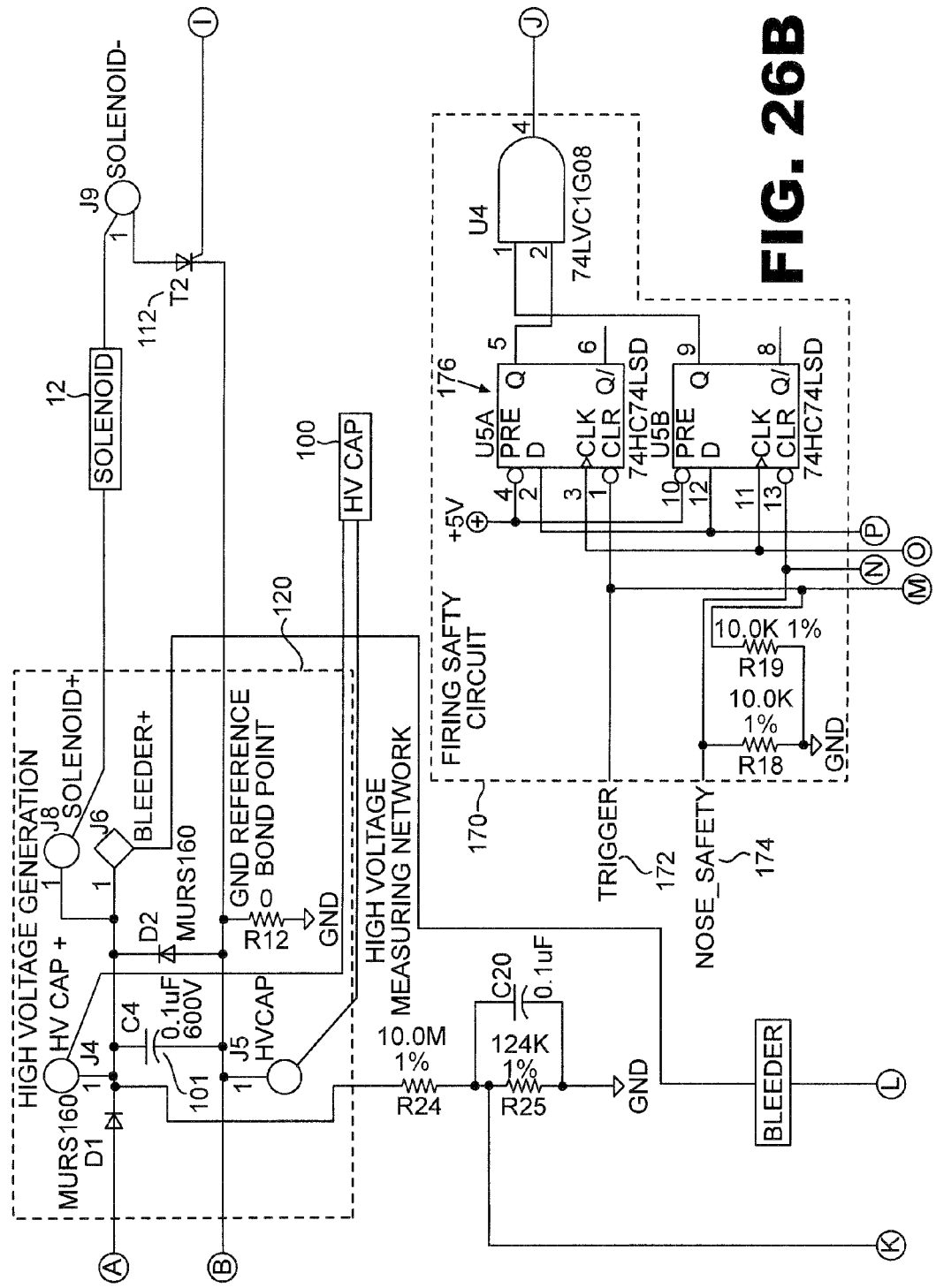
Figure 26C:
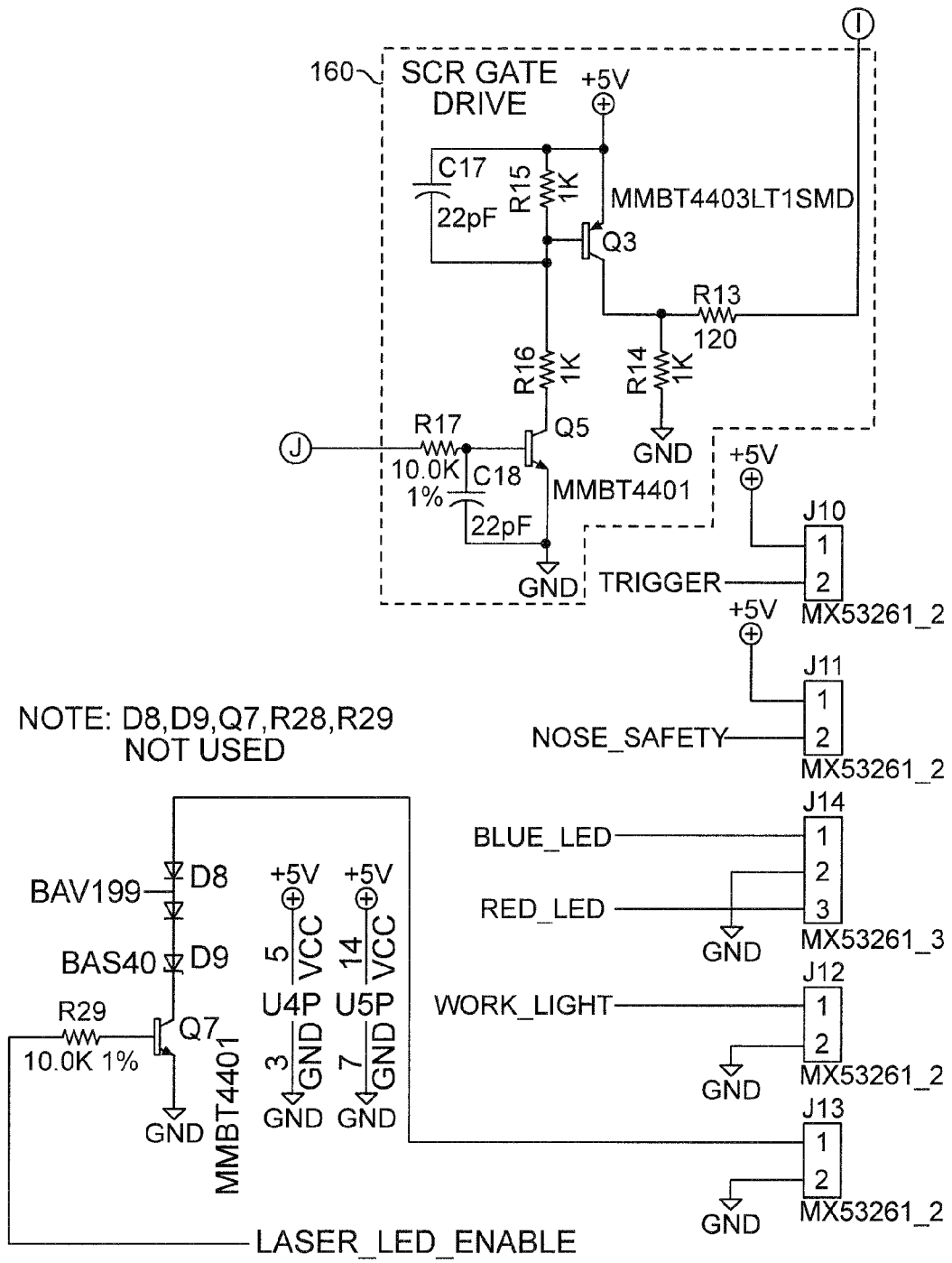
Figure 26D:
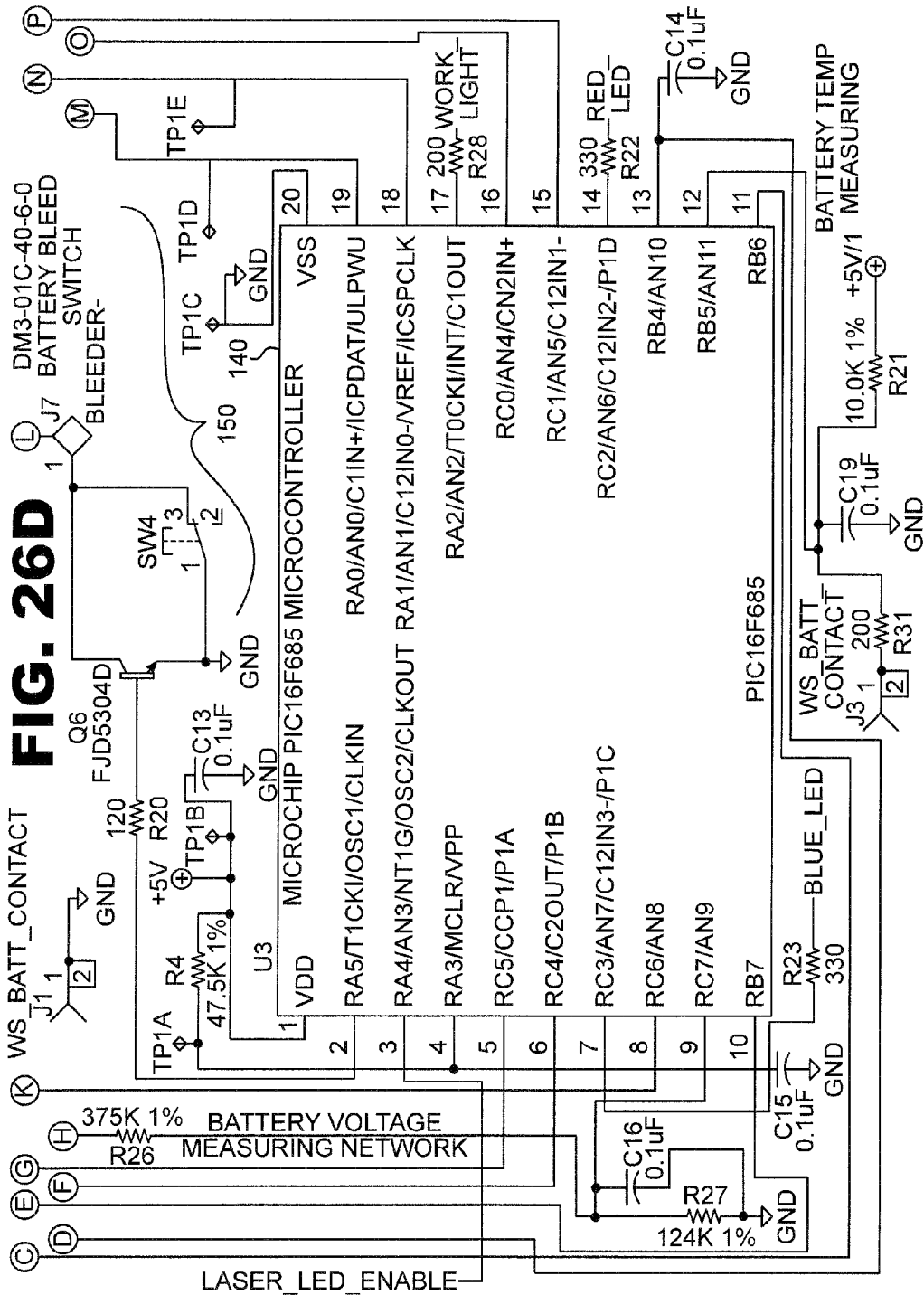

In other embodiments, as shown in FIGS. 25 and 25A, solenoid 12 power may be varied by using a hardness sensor 109a. Sensor 109a may engage a target work piece. In one embodiment, a pin 109b engages the work piece. Pin 109b attempt to penetrate the target material, and therefore will be displaced more with harder materials as the pin does not penetrate the material as easily. For example, pin 109b will move or deflect more in response to harder materials, while pin 109b will deflect less with softer materials, as pin 109b will tend to penetrate the softer materials and better maintain its initial position. Therefore, when a particular fastener drive depth is to be maintained, if pin 109b indicates that the material is harder, more power will be provided to solenoid 12, such as by increasing the charge on capacitor 100. To the contrary, if pin 109b indicates that the material is softer, then the charge in capacitor will be less, which may require bleeding of power if the power is above what is recommended by the sensor 109. A potentiometer or variable resistor 109c, or any other means of varying power contemplated above, may provide a signal, such as a change in voltage, which corresponds to the deflection of a hardness pin 109b as it engages a target work piece. It is contemplated that the hardness reading may be reported to a user, or may be used to automatically adjust the power supplied to solenoid 12 as discussed and contemplated in other power varying embodiments above. This sensor 109a would allow the device 10, such as by way of microcontroller 140, to adjust the power according to the hardness of the work piece material.

In another embodiment, a depth sensor 107 may used determine the height of the object that is to be secured by way of a discharged fastener, and adjust the power accordingly to control the drive depth of the fastener. The power may be adjusted by a potentiometer or any other means of varying power contemplated above, and may be used by device 10 to adjust the power of device 10 as contemplated and described above, with regard to the other sensors. If a target object is thicker (or taller), then a fastener will not be able to be driven as deep into the work piece since the target object will impede the fasteners path. More importantly, as user may not want to risk driving the fastener into the target object, as the object may become damaged. Accordingly, the depth sensor 107 will ultimately generate a signal to direct device 10 to charge capacitor 100 to a lower power level, thereby driving the fastener to a shallower depth. Conversely, if a target object is small, the more a particular fastener can be driven into a work piece without damaging the target object. The safety blade 56 discussed above could function, or operate, as this variable power sensor, although stand-alone sensing mechanisms may be used.

SCR gate drive circuit 160 fires solenoid 12 after receiving authorization from firing safety circuit 170. In operation, drive circuit 160 closes the normally open SCR gate (T2), which causes a rush of current from capacitor 100 through solenoid 12, and the ultimate firing of device 10. Once the current decreases below a particular value, such as 0.5 amps, the SCR is reset to an open position. Subsequently, capacitor 100 may be recharged as directed by high voltage generation circuit 120. SCR gate drive circuit 160 also provides a safety feature that prevents radio frequency (RF) signals from inadvertently closing SCR gate (T2) 112 by closing high speed switching transistors Q5 and Q3, which are susceptible to RF energy. When RF transmitters, such as walkie-talkies and cell phones, generate a local high RF energy field, high speed capacitance bypass capacitors C17, C18 divert the RF energy so that a charge does not develop across transistors Q3 and Q5. Such a charge could close the transistors (high speed switches), which would ultimately close the SCR gate and cause capacitor 100 to inadvertently discharge.

Backup capacitor (C4) 101 is included to provide protection against any failure or disconnection of flash capacitor 100. In one embodiment, backup capacitor 101 may have a substantially smaller capacity than, or be of a sufficiently small size with respect to, flash capacitor 100. In an exemplary embodiment, capacitor 101 is a 600 volt, 0.1 microfarad capacitor. Nevertheless, backup capacitor 101 is sufficient to ensure proper operation of the high voltage generation circuit 120, even though it may take a few charge cycles to reach the programmed output voltage. Basically backup capacitor 101 keeps the output voltage under control in the presence of a failure or disconnection or capacitor 100.

In one embodiment, the charge of capacitor 100 may be maintained to a programmed (target) voltage, while the tool awaits firing in a ready mode. This process may be referred to as a "pickling" process. Initially, the high voltage generation circuit 120 first charges capacitor 100 to a programmed voltage. In one exemplary embodiment, the capacitor 100 is charged to between 320 and 360 volts. Once reaching the programmed voltage, the generation circuit 120 is turned off. If this circuit does not automatically maintain the voltage on 100, the voltage on capacitor 100 will slowly discharge. To complicate matters more, the higher the programmed voltage, the more rapid the discharge. For instance, capacitor 100 may lose one to two volts per second following completion of the initial charge when set to its maximum voltage value. Therefore, in one embodiment, after the staple gun reaches a ready state (ready to fire) and the charging of capacitor 100 is terminated, the pickling process charges capacitor 100 periodically to maintain the charge on capacitor 100. In one embodiment, the microcontroller 140 will turn off the charge controller 124 and wait a period of time, such as, for example, 400 milliseconds, before turning the charge controller 124 on to re-charge capacitor 100. Once it is determined that capacitor is fully charged, the microcontroller 140 again turns off the charge controller 124 to terminate charging of capacitor 100. The pickling cycle then repeats as desired to maintain the charge of capacitor 100 while in ready mode until the device 10 is fired or until reaching a sleep state timeout or detection of a critically low battery. Although any interval may be used, in one exemplary embodiment, the cycle occurs every 400 milliseconds. The pickling process may be achieved or controlled by means other then explained in the embodiment above.

A firing safety circuit 170 may be provided to control the firing of, and prevent the misfiring of, device 10. In one embodiment, trigger switch 172 and safety switch 174 must both be closed, meaning that a user must both pull the trigger 55b and displace the safety blade 56 before the microcontroller can begin its firing sequence. In another embodiment, the safety blade 56 must be engaged (thereby closing the safety switch) before engaging the trigger 55b. In particular embodiment, after a fastener has been fired, the trigger 55b and safety 56 must be released (i.e., the respective switches 172, 174 opened) and re-engaged before firing the next fastener. This may help prevent any unintentional fastener firing.

Once the firing sequence is begun, there are two additional features that may prevent device 10 from firing. First, the proper execution firing sequence instructions are verified. If the instructions are not performed correctly, the microprocessor sends a false signal to a dual D-type flip-flop circuit 176. In one embodiment, the firing sequence includes instructions to clear a watchdog clock. These instructions are placed at different locations within the firing sequence. If the clock is not cleared within a predetermined time limit, meaning that the instructions to clear the clock have not been properly executed, a false signal is sent to the flip-flop circuit 176 to prevent firing of device 10. It is contemplated that other techniques may be used to verify that performance of the firing sequence occurs properly. The second safety feature that may also be over come, in this embodiment, is that the trigger and safety switches 172, 174 do not open after the firing sequence has begun. In this embodiment, this is accomplished by hard logic via flip-flop circuit 176. If one of the trigger or safety switch 172, 174 opens, the corresponding pull down resistor R19, R18 cannot be overcome, and therefore the corresponding overriding clear pins on U5A and U5B (pins 1, 13) pull the logic to low and a false signal (logic low) is sent to AND gate U4. Because U4 will not allow the SCR (T2) 112 to open without receiving true signals from both U5A and U5B, the SCR 112 will not open and solenoid 12 will not fire. Although other solutions may be possible, this firing safety circuit is valuable as it is a low cost solution for providing these safety features.

Processor logic power supply circuit 180 regulates the voltage within circuitry 110 with an ultra-low quiescent current low dropout regulator U6. A field effect transistor Q8 reduces the current load in circuit 110 when the microcontroller is in hibernation by powering off the control circuit in the high voltage generation circuit 120 and other resistors, such as the battery monitoring resistors.

A power control circuit 190 controls the supply of power to high voltage generation circuit 120. It also protects batteries from over-discharge. Lithium ion batteries, as well as other rechargeable batteries, must generally retain a minimum voltage to prevent failure, which results in the inability of a battery to be recharged. If it is determined that a battery's voltage falls below a critical power fail subpoint voltage, microcontroller 140 turns NPN transistor Q4 off, which turns off MOSFET Q2 and ultimately the current to high voltage generation circuit 120. This prevents any further draw from the battery in an attempt to prevent battery failure.

Power control circuit 190 may also provides a soft start capability. When microcontroller 140 turns on, MOSFET Q2 also turns on. Because Q2 may have low impedance, a high jump in current would normally occur, which could result in a surge within high voltage generation circuit 120. This surge could cause capacitor 100 to fire solenoid 12, if capacitor had a residual charge. To avoid this, C11, R2, and R3 provide a soft start capability by providing a linear ramp of current to high voltage generation circuit 120.

Although microcontroller 140 generally controls the firing of solenoid 12, it also provides other background operations, such as measuring and monitoring the battery voltage and temperature. If a dangerously low battery voltage occurs, device 10 may automatically shutdown to prevent battery cell damage. Device 10 may also shutdown when the battery cell discharge rate or temperature exceeds know limits. Sensors also exist that may indicate a capacitor over temperature condition, or over voltage conditions. Microcontroller 140 may also may control the bleeding of charge from capacitor 100, if desired. Microcontroller may also control and operate a laser guide LED, a work light LED, and the LED that indicates when the device 10 is ready for fastener discharge, if the capacitor is still charging, or if there is an issue or error within the battery or circuitry that needs attention. For example, a fast flashing light of one color may indicate that the battery is charging, and when colored light stops flashing, the battery is charged to the desired level. If there are fast-flashing alternating colors, it may indicate a low-battery condition. If the alternating flashing of colors slows, it may indicate that battery is ready for firing but only a limited number of discharges remain within the battery's capacity, such as, for example, 40 shots remain.

In one embodiment, the power source 104 is a DC power source, which may be a rechargeable battery, such as, for example, a 12-18 volt NiMH (nickel metal hydride), NiCd (nickel cadmium), or a Lithium-ion (Li-ion) battery. Nevertheless, it is contemplated that any commercially available battery, whether or not rechargeable, may be used. In an effort to reduce the weight of the device 10, a 12 volt (V) or 14.4V battery 104 may be used over an 18 volt battery without a significant effect on the overall performance of the device 10. In another embodiment, a 16.8 Li-ion battery is used. In one embodiment, the 1.5-3 second charge and discharge cycle times identified earlier in the application may be achieved with as low as a 14.4V battery. In one embodiment, Li-ion batteries are used as they provide more power density, and therefore, provide more shots per charge. This also allows the weight of device 10 to be reduced, since fewer Li-ions batteries may be used—as Li-ion batteries are more efficient. For example, in one embodiment, when using four 4.2V Li-ions cells (14.4V total), 1.55 amp hours are provided, which results in approximately 580 shots per charge. When using a 12-cell 14.4V Ni-Cad battery pack, approximately 970 shots may be achieved per charge. However, the 12-cell Ni-Cad battery weights approximately 2.35 pounds, while the 4-cell Li-ion battery weighs 0.77 pounds.

The battery 104 attaches to the rear side of the device 10 in a manner that allows for its removal. Locating the battery 104 in the rear side helps to balance the device 10 and to better facilitate single hand operation of the device 10. In one embodiment, battery 104 must be removed prior to disassembling device 10. Further, capacitor 100 may automatically be bled upon removal of battery 104. Finally, it is contemplated that the device 10 may also be powered solely, or in addition to a DC power source, by an alternating current (AC) power source. The AC power source may be used as an alternative to the DC source 104, and/or to charge battery 104.

It is contemplated that one or more LEDs could be used to indicate that the capacitor 100 is charging, the stapler 10 is ready to fire, the battery 104 is low or empty, and/or the tool has a fault condition. It is also contemplated that an LED or other light source may be included on the stapler 10 to light any work surfaces. Laser guides may also be used to mark the firing locations, such as to indicate the center of the tool or the side boundaries of the fastening area. A flip-up stud centering guide may also exist to ensure the cable or the like is always is secured to the center of a 2×4 or 2×6 stud.

While this invention has been described with reference to particular embodiments thereof, it shall be understood that such description is by way of illustration and not by way of limitation. Accordingly, the scope and content of the invention are to be defined only by the terms of the appended claims.

What is claimed is:

1. A nailer or stapler device comprising:
   a solenoid;
   a fastener striker in operational communication with the solenoid;
   a flash capacitor in operational communication with the solenoid, the capacitor operating at 400 or more microfarads and having a charging capacity of at least approximately 180 volts; and,
   a control circuit in operational communication with the flash capacitor, the circuit configured to both substantially charge the flash capacitor by at least 180 volts from a direct current battery and substantially discharge the capacitor within approximately 3 seconds or less, the battery having a charging capacity of at least approximately 12 volts,
   the control circuit including a high voltage generation circuit having a transformer for converting the voltage supplied by the battery to a higher voltage for charging the flash capacitor and a microcontroller configured to control both the operation of the high voltage generation circuit and the charging of the flash capacitor.

2. The device recited in claim 1, wherein the control circuit is configured to both substantially charge and discharge the flash capacitor in about 1.5 seconds or less.

3. The device of claim 2, wherein the flash capacitor is an approximately 1000-1200 microfarad capacitor.

4. The device recited in claim 1, wherein the capacitor operates at 1,000 or more microfarads, and has a charging capacity of at least 330 volts.

5. The device recited in claim 1, wherein the capacitor is an approximately 1,200 microfarad capacitor having a charging capacity of about 360 volts.

6. The device recited in claim 1, the device further comprising:
   a heat sink in operable communication with the capacitor, the heat sink configured to absorb heat generated by the capacitor, the heat sink having a plurality of independent protrusions extending outwardly from an exterior surface of the heat sink to increase cooling thereof.

7. The device recited in claim 1, wherein the control circuit includes a firing safety circuit, the safety circuit having a hard logic override that prevents the stapler from discharging a staple when either the trigger switch and/or the safety switch is opened after a capacitor firing sequence operation has been initiated, wherein the capacitor firing sequence operation is initiated after both a trigger switch and a safety switch are closed.

8. The device recited in claim 7, wherein control circuit includes a watchdog timer that is cleared by the execution of particular instructions, and wherein the firing sequence is terminated if the watchdog timer is not cleared within a particular period of time according to a particular sequence of instructions.

9. The device recited in claim 1, wherein the control circuit includes a SCR gate drive circuit, the drive circuit including a capacitor that redirects a charge provided by radiofrequency or electromagnetic transmissions that would otherwise accumulate to close a transistor, the transistor configured to facilitate the opening of a capacitor discharge gate.

10. The device recited in claim 1, wherein the control circuit includes a power control circuit that provides a gradual increase in power to a high voltage generation circuit for charging the capacitor, the increase in power occurring when the device is turned on or awakens from a hibernation state.

11. The device recited in claim 1, the device further comprising:
    a hardness sensor configured to engage a work piece and generate a signal corresponding to the hardness of the work piece for use by the control circuit to vary the charging limit of the capacitor between a minimum and maximum charge.

12. The device recited in claim 1, the device further comprising:
    a depth sensor arranged along the device to determine the depth to which a fastener discharged into a work piece based upon a height of a target object, the target object being located on the work piece and positioned between the work piece and the device, the depth sensor generating a signal corresponding to the height of the target object for use by the control circuit to vary the discharge power by varying the charging limit of the capacitor between a minimum and maximum charge.

13. The device recited in claim 1, wherein the fastener striker having a length extending in a fastener driving direction and a pair of opposing sides separated by a thickness of the striker, the striker further including a gusset forming a ridge-like protrusion extending outwardly along a length of the striker from one of the striker sides, the gusset being positioned within a width of the striker side between the terminal edges of the side.

14. The device recited in claim 1, the device further comprising:
    an armature-retention mechanism, the mechanism configured for retaining an armature of the solenoid in a ready-position prior to capacitor discharge, wherein the mechanism comprises one or more spring-loaded ball bearings configured to engage a recess arranged within a surface of the armature when retaining the armature in the ready-position.

15. The device recited in claim 1, wherein the stapler is configured to discharge one or more insulated staples, each of the insulated staples including:
    a staple having a width, and a bight section extending between a pair of legs extending from an underside of the bight section; and,
    an insulation form having a width that is substantially equal to or less than the staple width, the insulation including a crown section having a top side for engaging the underside of the bight section,
    wherein the insulation form is engagingly positioned along the underside of the staple bight section.

16. The device in claim 15, wherein a quantity of attached insulation forms form an insulation strip and a quantity of attached staples form a staple strip, wherein each of the strips are substantially the same length, and wherein the quantity of insulation forms is equal to the quantity of staples.

17. The device as recited in claim 15, wherein the insulation strip is adhesively placed within the staple strip.

18. A method of discharging a fastener from a nailer or stapler device, the method comprising:
    providing a fastener-discharging device having a solenoid, a flash capacitor, a direct current battery, and a control circuit having a microcontroller, the flash capacitor operating at 400 or more microfarads and having a charging capacity of at least 180 volts and the battery having a charging capacity of at least approximately 12 volts;

charging the capacitor within approximately 3 seconds or less from the direct current battery to a desired charge of at least approximately 180 volts, the charging occurring by way of a high voltage generation circuit of the control circuit, the control circuit also including a microcontroller configured to control operation of the high voltage generation circuit, and to monitor and maintain the desired voltage of the capacitor after the capacitor has been charged to the desired voltage and before discharging the capacitor for firing the solenoid; and, discharging the capacitor to operate a solenoid, the solenoid thereby driving a striker to discharge a fastener, the steps of charging and discharging the flash capacitor being performed within a total of 3 seconds or less.

19. The method as recited in claim 18, further comprising the following steps prior to the step of discharging:

engaging a safety mechanism to close a safety switch of the control circuit;

engaging a trigger to close a trigger switch of the control circuit;

initiating a capacitor firing sequence operation after determining the safety switch and the trigger switch are closed after performing the steps of engaging a safety mechanism and engaging a trigger; and, maintaining the safety switch and the trigger switch in a closed position to prevent operation of a hard logic override, the hard logic override configured to terminate the firing sequence after the firing sequence was initiated according to the prior step to prevent discharge of the capacitor if one or more of the safety switch and the trigger switch are opened before the firing sequence operation is completed.

20. The method as recited in claim 18, further comprising the following step:

diverting, by way of a capacitor, a charge provided by radiofrequency or electromagnetic transmissions that otherwise would accumulate to close a transistor that facilitates the opening of a capacitor discharge gate to discharge the flash capacitor and fire the solenoid.

21. The method as recited in claim 18, further comprising the following step:

gradually ramping-up power when the device is turned on or when the device awakens from a hibernation state to help prevent a surge of power in the circuit.

22. The method as recited in claim 18, further comprising the following step:

engaging a work piece with the fastener-discharging device, the device including a hardness sensor for measuring the hardness of a work piece;

generating a signal by way of the hardness sensor, where the signal is related to the deflection of the sensor;

adjusting the power output of the device according to the signal, wherein the output power increases when the deflection increases, and the output power decreases when the deflection decreases.

23. The method as recited in claim 18, further comprising the following step:

engaging a work piece with the fastener-discharging device, the device having a depth sensor configured to generate a signal representing a height of a target object located between the device and the work piece, the device configured to discharge a fastener comprising a staple having a pair of legs and a bight section extending between the pair of legs;

generating a signal by way of the depth sensor, the signal representing the height of the target object;

determining an amount of output power for discharging the staple a particular depth into the work piece such that the bight section of the staple is generally maintained a distance from the work piece generally corresponding to the height of the target work piece;

discharging the flash capacitor to drive the solenoid at the output power determined according to the prior step wherein the output power generally increases as the target object height decreases and the output power generally decreases as the height increases.

* * * * *